US012346984B2

(12) United States Patent
Chapa et al.

(10) Patent No.: US 12,346,984 B2
(45) **Date of Patent: *Jul. 1, 2025**

(54) SYSTEMS AND METHODS OF DELAYED AUTHENTICATION AND BILLING FOR ON-DEMAND PRODUCTS

(71) Applicant: CSIDENTITY CORPORATION, Austin, TX (US)

(72) Inventors: Isaac Chapa, Austin, TX (US); Steven Hatley, Round Rock, TX (US); Joe Ross, Austin, TX (US)

(73) Assignee: CSIDENTITY CORPORATION, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/462,231

(22) Filed: Sep. 6, 2023

(65) Prior Publication Data

US 2024/0212084 A1 Jun. 27, 2024

Related U.S. Application Data

(63) Continuation of application No. 17/449,151, filed on Sep. 28, 2021, now Pat. No. 11,790,473, which is a (Continued)

(51) Int. Cl.

| | |
|---|---|
| ***G06Q 10/00*** | (2023.01) |
| ***G06Q 30/04*** | (2012.01) |
| ***G06Q 50/26*** | (2012.01) |

(52) U.S. Cl.
CPC ........... *G06Q 50/265* (2013.01); *G06Q 30/04* (2013.01)

(58) Field of Classification Search
CPC ............................. G06Q 50/265; G06Q 30/04
See application file for complete search history.

(56) References Cited

U.S. PATENT DOCUMENTS

| | | | |
|---|---|---|---|
| 3,752,904 | A | 8/1973 | Waterbury |
| 4,795,890 | A | 1/1989 | Goldman |

(Continued)

FOREIGN PATENT DOCUMENTS

| | | |
|---|---|---|
| AU | 2017397325 | 8/2018 |
| AU | 2018291152 | 11/2021 |

(Continued)

OTHER PUBLICATIONS

U.S. Appl. No. 12/705,489, filed Feb. 12, 2010, Bargoli et al.

(Continued)

*Primary Examiner* — Gabrielle A McCormick
(74) *Attorney, Agent, or Firm* — Knobbe, Martens, Olson & Bear, LLP

(57) ABSTRACT

In one embodiment, a method includes receiving, from a requestor, a request for an on-demand identity product in relation to an identity of a consumer, the request comprising personally identifying information (PII) of the consumer. The method also includes executing, using the PII, a partial registration of the consumer for the on-demand identity product, the partial registration omitting satisfaction of at least one security requirement. The method additionally includes determining whether delayed authentication is enabled for the on-demand identity product. Moreover, the method includes, responsive to a determination that delayed authentication is enabled for the on-demand identity product: conditionally suspending the at least one security requirement; initiating provision of the on-demand identity product to the requestor; and restricting the requestor's access to determined sensitive data resulting from the initiated provision at least until the at least one security requirement is satisfied.

20 Claims, 4 Drawing Sheets

Related U.S. Application Data continuation of application No. 16/848,260, filed on Apr. 14, 2020, now Pat. No. 11,164,271, which is a continuation of application No. 14/481,714, filed on Sep. 9, 2014, now Pat. No. 10,664,936, which is a continuation-in-part of application No. 14/272,942, filed on May 8, 2014, now abandoned, which is a continuation of application No. 13/870,489, filed on Apr. 25, 2013, now Pat. No. 8,751,388.

(60) Provisional application No. 61/876,086, filed on Sep. 10, 2013, provisional application No. 61/786,585, filed on Mar. 15, 2013.

(56) References Cited

U.S. PATENT DOCUMENTS

| | | | |
|---|---|---|---|
| 4,891,503 | A | 1/1990 | Jewell |
| 4,977,595 | A | 12/1990 | Ohta et al. |
| 4,989,141 | A | 1/1991 | Lyons et al. |
| 5,095,480 | A | 3/1992 | Fenner |
| 5,126,936 | A | 6/1992 | Champion et al. |
| 5,351,293 | A | 9/1994 | Michener et al. |
| 5,490,258 | A | 2/1996 | Fenner |
| 5,590,038 | A | 12/1996 | Pitroda |
| 5,640,577 | A | 6/1997 | Scharmer |
| 5,659,725 | A | 8/1997 | Levy et al. |
| 5,659,731 | A | 8/1997 | Gustafson |
| 5,715,314 | A | 2/1998 | Payne et al. |
| 5,719,941 | A | 2/1998 | Swift et al. |
| 5,748,098 | A | 5/1998 | Grace |
| 5,754,632 | A | 5/1998 | Smith |
| 5,828,840 | A | 10/1998 | Cowan et al. |
| 5,832,068 | A | 11/1998 | Smith |
| 5,842,224 | A | 11/1998 | Fenner |
| 5,844,218 | A | 12/1998 | Kawan et al. |
| 5,860,136 | A | 1/1999 | Fenner |
| 5,866,889 | A | 2/1999 | Weiss et al. |
| 5,881,131 | A | 3/1999 | Farris et al. |
| 5,903,830 | A | 5/1999 | Joao et al. |
| 5,913,196 | A | 6/1999 | Talmor et al. |
| 5,956,693 | A | 9/1999 | Geerlings |
| 5,966,695 | A | 10/1999 | Melchione et al. |
| 5,999,596 | A | 12/1999 | Walker et al. |
| 6,021,397 | A | 2/2000 | Jones et al. |
| 6,021,943 | A | 2/2000 | Chastain |
| 6,026,440 | A | 2/2000 | Shrader et al. |
| 6,038,551 | A | 3/2000 | Barlow et al. |
| 6,055,570 | A | 4/2000 | Nielsen |
| 6,069,941 | A | 5/2000 | Byrd et al. |
| 6,072,894 | A | 6/2000 | Payne |
| 6,073,106 | A | 6/2000 | Rozen et al. |
| 6,073,140 | A | 6/2000 | Morgan et al. |
| 6,084,704 | A | 7/2000 | Button et al. |
| 6,085,242 | A | 7/2000 | Chandra |
| 6,119,103 | A | 9/2000 | Basch et al. |
| 6,128,602 | A | 10/2000 | Northington et al. |
| 6,157,707 | A | 12/2000 | Baulier et al. |
| 6,161,139 | A | 12/2000 | Win et al. |
| 6,182,068 | B1 | 1/2001 | Culliss |
| 6,182,219 | B1 | 1/2001 | Feldbau et al. |
| 6,182,229 | B1 | 1/2001 | Nielsen |
| 6,196,460 | B1 | 3/2001 | Shin |
| 6,233,588 | B1 | 5/2001 | Marchoili et al. |
| 6,247,000 | B1 | 6/2001 | Hawkins et al. |
| 6,253,202 | B1 | 6/2001 | Gilmour |
| 6,254,000 | B1 | 7/2001 | Degen et al. |
| 6,263,447 | B1 | 7/2001 | French et al. |
| 6,269,369 | B1 | 7/2001 | Robertson |
| 6,282,658 | B2 | 8/2001 | French et al. |
| 6,292,795 | B1 | 9/2001 | Peters et al. |
| 6,311,169 | B2 | 10/2001 | Duhon |
| 6,321,339 | B1 | 11/2001 | French et al. |
| 6,327,578 | B1 | 12/2001 | Linehan |
| 6,343,279 | B1 | 1/2002 | Bissonette et al. |
| 6,356,937 | B1 | 3/2002 | Montville et al. |
| 6,397,212 | B1 | 5/2002 | Biffar |
| 6,453,353 | B1 | 9/2002 | Win et al. |
| 6,457,012 | B1 | 9/2002 | Jatkowski |
| 6,463,533 | B1 | 10/2002 | Calamera et al. |
| 6,473,740 | B2 | 10/2002 | Cockril et al. |
| 6,496,936 | B1 | 12/2002 | French et al. |
| 6,510,415 | B1 | 1/2003 | Talmor et al. |
| 6,523,021 | B1 | 2/2003 | Monberg et al. |
| 6,523,041 | B1 | 2/2003 | Morgan et al. |
| 6,539,377 | B1 | 3/2003 | Culliss |
| 6,564,210 | B1 | 5/2003 | Korda et al. |
| 6,571,334 | B1 | 5/2003 | Feldbau et al. |
| 6,574,736 | B1 | 6/2003 | Andrews |
| 6,581,059 | B1 | 6/2003 | Barrett et al. |
| 6,601,173 | B1 | 7/2003 | Mohler |
| 6,607,136 | B1 | 8/2003 | Atsmon et al. |
| 6,622,131 | B1 | 9/2003 | Brown et al. |
| 6,629,245 | B1 | 9/2003 | Stone et al. |
| 6,647,383 | B1 | 11/2003 | August et al. |
| 6,654,786 | B1 | 11/2003 | Fox et al. |
| 6,658,393 | B1 | 12/2003 | Basch et al. |
| 6,679,425 | B1 | 1/2004 | Sheppard et al. |
| 6,714,944 | B1 | 3/2004 | Shapiro et al. |
| 6,725,381 | B1 | 4/2004 | Smith et al. |
| 6,734,886 | B1 | 5/2004 | Hagan et al. |
| 6,750,985 | B2 | 6/2004 | Rhoads |
| 6,754,665 | B1 | 6/2004 | Futagami et al. |
| 6,766,327 | B2 | 7/2004 | Morgan, Jr. et al. |
| 6,766,946 | B2 | 7/2004 | Iida et al. |
| 6,782,379 | B2 | 8/2004 | Lee |
| 6,795,812 | B1 | 9/2004 | Lent et al. |
| 6,796,497 | B2 | 9/2004 | Benkert et al. |
| 6,804,346 | B1 | 10/2004 | Mewhinney |
| 6,805,287 | B2 | 10/2004 | Bishop et al. |
| 6,816,850 | B2 | 11/2004 | Culliss |
| 6,816,871 | B2 | 11/2004 | Lee |
| 6,823,319 | B1 | 11/2004 | Lynch et al. |
| 6,829,711 | B1 | 12/2004 | Kwok et al. |
| 6,845,448 | B1 | 1/2005 | Chaganti et al. |
| 6,857,073 | B2 | 2/2005 | French et al. |
| 6,871,287 | B1 | 3/2005 | Ellingson |
| 6,892,307 | B1 | 5/2005 | Wood et al. |
| 6,900,731 | B2 | 5/2005 | Kreiner et al. |
| 6,907,408 | B2 | 6/2005 | Angel |
| 6,908,030 | B2 | 6/2005 | Rajasekaran et al. |
| 6,910,624 | B1 | 6/2005 | Natsuno |
| 6,920,435 | B2 | 7/2005 | Hoffman et al. |
| 6,928,487 | B2 | 8/2005 | Eggebraaten et al. |
| 6,934,714 | B2 | 8/2005 | Meinig |
| 6,934,849 | B2 | 8/2005 | Kramer et al. |
| 6,934,858 | B2 | 8/2005 | Woodhill |
| 6,947,989 | B2 | 9/2005 | Gullotta et al. |
| 6,950,807 | B2 | 9/2005 | Brock |
| 6,950,809 | B2 | 9/2005 | Dahan et al. |
| 6,950,858 | B2 | 9/2005 | Ogami |
| 6,952,682 | B1 | 10/2005 | Wellman |
| 6,965,881 | B1 | 11/2005 | Brickell et al. |
| 6,968,319 | B1 | 11/2005 | Remington et al. |
| 6,973,462 | B2 | 12/2005 | Dattero et al. |
| 6,983,381 | B2 | 1/2006 | Jerdonek |
| 6,985,887 | B1 | 1/2006 | Sunstein et al. |
| 6,986,461 | B1 | 1/2006 | Geoghegan et al. |
| 6,988,085 | B2 | 1/2006 | Hedy |
| 6,993,596 | B2 | 1/2006 | Hinton et al. |
| 6,999,941 | B1 | 2/2006 | Agarwal |
| 7,016,907 | B2 | 3/2006 | Boreham et al. |
| 7,028,013 | B2 | 4/2006 | Saeki |
| 7,028,052 | B2 | 4/2006 | Chapman et al. |
| 7,039,607 | B2 | 5/2006 | Watarai et al. |
| 7,043,476 | B2 | 5/2006 | Robson |
| 7,058,817 | B1 | 6/2006 | Ellmore |
| 7,059,531 | B2 | 6/2006 | Beenau et al. |
| 7,062,475 | B1 | 6/2006 | Szabo et al. |
| 7,076,462 | B1 | 7/2006 | Nelson et al. |
| 7,085,727 | B2 | 8/2006 | VanOrman |
| 7,089,584 | B1 | 8/2006 | Sharma |
| 7,107,241 | B1 | 9/2006 | Pinto |
| 7,117,172 | B1 | 10/2006 | Black |

(56) References Cited

U.S. PATENT DOCUMENTS 7,121,471 B2 10/2006 Beenau et al.
7,124,144 B2 10/2006 Christianson et al.
7,154,375 B2 12/2006 Beenau et al.
7,155,739 B2 12/2006 Bari et al.
7,174,454 B2 2/2007 Roskind
7,177,846 B2 2/2007 Moenickheim et al.
7,194,416 B1 3/2007 Provost et al.
7,200,602 B2 4/2007 Jonas
7,203,653 B1 4/2007 McIntosh
7,209,895 B2 4/2007 Kundtz et al.
7,219,107 B2 5/2007 Beringer
7,222,369 B2 5/2007 Vering et al.
7,225,464 B2 5/2007 Satyavolu et al.
7,231,657 B2 6/2007 Honarvar et al.
7,234,156 B2 6/2007 French et al.
7,234,160 B2 6/2007 Vogel et al.
7,237,267 B2 6/2007 Rayes et al.
7,240,199 B2 7/2007 Tomkow
7,240,363 B1 7/2007 Ellingson
7,243,369 B2 7/2007 Bhat et al.
7,246,067 B2 7/2007 Austin et al.
7,246,740 B2 7/2007 Swift et al.
7,249,096 B1 7/2007 Lasater et al.
7,249,113 B1 7/2007 Continelli et al.
7,251,347 B2 7/2007 Smith
7,263,497 B1 * 8/2007 Wiser ................ G06Q 30/0633
705/26.8
7,289,971 B1 10/2007 O'Neil et al.
7,303,120 B2 12/2007 Beenau et al.
7,310,611 B2 12/2007 Shibuya et al.
7,314,167 B1 1/2008 Kiliccote
7,328,233 B2 2/2008 Salim et al.
7,330,871 B2 2/2008 Barber
7,333,635 B2 2/2008 Tsantes et al.
7,337,468 B2 2/2008 Metzger
7,340,042 B2 3/2008 Cluff et al.
7,340,679 B2 3/2008 Botscheck et al.
7,343,149 B2 3/2008 Benco
7,343,295 B2 3/2008 Pomerance
7,356,503 B1 4/2008 Johnson et al.
7,356,506 B2 4/2008 Watson et al.
7,356,516 B2 4/2008 Richey et al.
7,370,044 B2 5/2008 Mulhern et al.
7,370,351 B1 5/2008 Ramachandran et al.
7,383,988 B2 6/2008 Slonecker, Jr.
7,386,448 B1 6/2008 Poss et al.
7,389,913 B2 6/2008 Starrs
7,403,942 B1 7/2008 Bayliss
7,421,732 B2 9/2008 Costa-Requena et al.
7,433,864 B2 10/2008 Malik
7,437,679 B2 10/2008 Uemura et al.
7,438,226 B2 10/2008 Helsper et al.
7,444,414 B2 10/2008 Foster et al.
7,444,518 B1 10/2008 Dharmarajan et al.
7,451,113 B1 11/2008 Kasower
7,458,508 B1 12/2008 Shao et al.
7,460,857 B2 12/2008 Roach, Jr.
7,467,401 B2 12/2008 Cicchitto
7,478,157 B2 1/2009 Bohrer et al.
7,480,631 B1 1/2009 Merced et al.
7,490,356 B2 2/2009 Lieblich et al.
7,503,489 B2 3/2009 Heffez
7,509,117 B2 3/2009 Yum
7,509,278 B2 3/2009 Jones
7,512,221 B2 3/2009 Toms
7,519,558 B2 4/2009 Ballard et al.
7,526,796 B2 4/2009 Lulich et al.
7,529,698 B2 5/2009 Joao
7,530,097 B2 5/2009 Casco-Arias et al.
7,542,993 B2 6/2009 Satterfield et al.
7,543,739 B2 6/2009 Brown et al.
7,546,271 B1 6/2009 Chmielewski et al.
7,548,886 B2 6/2009 Kirkland et al.
7,552,080 B1 6/2009 Willard et al.
7,552,123 B2 6/2009 Wade et al.
7,552,467 B2 6/2009 Lindsay
7,555,459 B2 6/2009 Dhar et al.
7,562,184 B2 7/2009 Henmi et al.
7,562,814 B1 7/2009 Shao et al.
7,566,002 B2 7/2009 Love et al.
7,571,473 B1 8/2009 Boydstun et al.
7,575,157 B2 8/2009 Barnhardt et al.
7,577,665 B2 8/2009 Ramer et al.
7,577,934 B2 8/2009 Anonsen et al.
7,580,884 B2 8/2009 Cook
7,581,112 B2 8/2009 Brown et al.
7,584,126 B1 9/2009 White
7,584,146 B1 9/2009 Duhon
7,587,366 B2 9/2009 Grim, III et al.
7,587,368 B2 9/2009 Felsher
7,603,701 B2 10/2009 Gaucas
7,606,401 B2 10/2009 Hoffman et al.
7,606,725 B2 10/2009 Robertson et al.
7,610,216 B1 10/2009 May et al.
7,613,600 B2 11/2009 Krane
7,620,596 B2 11/2009 Knudson et al.
7,623,844 B2 11/2009 Herrmann et al.
7,630,932 B2 12/2009 Danaher et al.
7,634,737 B2 12/2009 Beringer et al.
7,636,941 B2 12/2009 Blinn et al.
7,641,113 B1 1/2010 Alvarez et al.
7,647,344 B2 1/2010 Skurtovich, Jr. et al.
7,653,592 B1 1/2010 Flaxman et al.
7,653,600 B2 1/2010 Gustin
7,653,688 B2 1/2010 Bittner
7,657,431 B2 2/2010 Hayakawa
7,660,989 B2 2/2010 Tomkow
7,672,833 B2 3/2010 Blume et al.
7,676,834 B2 3/2010 Camaisa et al.
7,685,096 B2 3/2010 Margolus et al.
7,685,209 B1 3/2010 Norton et al.
7,685,279 B2 3/2010 Miltonberger et al.
7,686,214 B1 3/2010 Shao et al.
7,689,487 B1 3/2010 Britto et al.
7,689,505 B2 3/2010 Kasower
7,689,563 B1 3/2010 Jacobson
7,690,032 B1 3/2010 Peirce
7,698,214 B1 4/2010 Lindgren
7,698,217 B1 4/2010 Phillips et al.
7,698,445 B2 4/2010 Fitzpatrick et al.
7,698,558 B2 4/2010 Tomkow
7,707,271 B2 4/2010 Rudkin et al.
7,707,624 B2 4/2010 Tomkow
7,708,190 B2 5/2010 Brandt et al.
7,711,635 B2 5/2010 Steele et al.
7,725,385 B2 5/2010 Royer et al.
7,730,078 B2 6/2010 Schwabe et al.
7,739,139 B2 6/2010 Robertson et al.
7,747,494 B1 6/2010 Kothari et al.
7,747,520 B2 6/2010 Livermore et al.
7,747,521 B2 6/2010 Serio
7,747,542 B2 6/2010 Morley et al.
7,761,384 B2 7/2010 Madhogarhia
7,761,568 B1 7/2010 Levi et al.
7,765,166 B2 7/2010 Beringer et al.
7,765,311 B2 7/2010 Itabashi et al.
7,769,696 B2 8/2010 Yoda
7,769,697 B2 8/2010 Fieschi et al.
7,769,998 B2 8/2010 Lynch et al.
7,774,270 B1 8/2010 MacCloskey
7,788,040 B2 8/2010 Haskell et al.
7,792,715 B1 9/2010 Kasower
7,792,725 B2 9/2010 Booraem et al.
7,793,835 B1 9/2010 Coggeshall et al.
7,797,725 B2 9/2010 Lunt et al.
7,801,828 B2 9/2010 Candella et al.
7,801,956 B1 9/2010 Cumberbatch et al.
7,802,104 B2 9/2010 Dickinson
7,810,036 B2 10/2010 Bales et al.
7,818,228 B1 10/2010 Coulter
7,827,115 B2 11/2010 Weller et al.
7,841,004 B1 11/2010 Balducci et al.
7,841,008 B1 11/2010 Cole et al.
7,844,520 B1 11/2010 Franklin

(56) References Cited

U.S. PATENT DOCUMENTS 7,849,014 B2 12/2010 Erikson
7,849,624 B2 12/2010 Holt et al.
7,853,493 B2 12/2010 DeBie et al.
7,853,533 B2 12/2010 Eisen
7,853,984 B2 12/2010 Antell et al.
7,865,557 B2 1/2011 Tomkow
7,865,958 B2 1/2011 Lieblich et al.
7,870,078 B2 1/2011 Clark et al.
7,877,304 B1 1/2011 Coulter
7,877,784 B2 1/2011 Chow et al.
7,880,728 B2 2/2011 de los Reyes et al.
7,886,008 B2 2/2011 Tomkow et al.
7,908,242 B1 3/2011 Achanta
7,909,246 B2 3/2011 Hogg et al.
7,912,865 B2 3/2011 Akerman et al.
7,930,285 B2 4/2011 Abraham et al.
7,930,411 B1 4/2011 Hayward
7,941,324 B1 5/2011 Sholtis
7,957,266 B2 6/2011 Kodialam et al.
7,958,046 B2 6/2011 Doerner et al.
7,966,192 B2 6/2011 Pagliari et al.
7,966,372 B1 6/2011 Tomkow
7,970,679 B2 6/2011 Kasower
7,975,299 B1 7/2011 Balducci et al.
7,979,908 B2 7/2011 Millwee
7,983,932 B2 7/2011 Kane
7,983,979 B2 7/2011 Holland, IV
7,991,688 B2 8/2011 Phelan et al.
8,001,153 B2 8/2011 Skurtovich, Jr. et al.
8,001,235 B2 8/2011 Russ et al.
8,005,155 B1 8/2011 Lee et al.
8,011,582 B2 9/2011 Ghafarzadeh
8,032,932 B2 10/2011 Speyer et al.
8,037,097 B2 10/2011 Guo et al.
8,041,956 B1 10/2011 White et al.
8,055,904 B1 11/2011 Cato et al.
8,060,424 B2 11/2011 Kasower
8,060,916 B2 11/2011 Bajaj et al.
8,065,233 B2 11/2011 Lee et al.
8,073,785 B1 12/2011 Candella et al.
8,078,453 B2 12/2011 Shaw
8,078,524 B2 12/2011 Crawford et al.
8,078,881 B1 12/2011 Liu
8,079,070 B2 12/2011 Camaisa et al.
8,099,341 B2 1/2012 Varghese
8,104,679 B2 1/2012 Brown
8,116,731 B2 2/2012 Buhrmann et al.
8,116,751 B2 2/2012 Aaron
8,127,982 B1 3/2012 Casey et al.
8,127,986 B1 3/2012 Taylor et al.
8,131,777 B2 3/2012 McCullouch
8,144,368 B2 3/2012 Rodriguez et al.
8,151,327 B2 4/2012 Eisen
8,161,104 B2 4/2012 Tomkow
8,172,132 B2 5/2012 Love et al.
8,175,889 B1 5/2012 Girulat et al.
8,185,747 B2 5/2012 Wood et al.
8,190,513 B2 5/2012 Felger
8,195,549 B2 6/2012 Kasower
8,209,389 B2 6/2012 Tomkow
8,219,771 B2 7/2012 Le Neel
8,219,822 B2 7/2012 Camaisa et al.
8,224,723 B2 7/2012 Bosch et al.
8,224,913 B2 7/2012 Tomkow
8,225,395 B2 7/2012 Atwood et al.
8,229,810 B2 7/2012 Butera et al.
8,229,844 B2 7/2012 Felger
8,234,498 B2 7/2012 Britti et al.
8,239,677 B2 8/2012 Colson
8,239,929 B2 8/2012 Kwan et al.
8,241,369 B2 8/2012 Stevens
8,244,629 B2 8/2012 Lewis et al.
8,244,848 B1 8/2012 Narayanan et al.
8,255,452 B2 8/2012 Piliouras
8,255,971 B1 8/2012 Webb et al.
8,255,978 B2 8/2012 Dick
8,260,706 B2 9/2012 Freishtat et al.
8,261,334 B2 9/2012 Hazlehurst et al.
8,266,065 B2 9/2012 Dilip et al.
8,275,845 B2 9/2012 Tomkow
8,280,348 B2 10/2012 Snyder et al.
8,281,372 B1 10/2012 Vidal
8,285,613 B1 10/2012 Coulter
8,285,656 B1 10/2012 Chang et al.
8,291,218 B2 10/2012 Garcia et al.
8,291,477 B2 10/2012 Lunt
8,295,898 B2 10/2012 Ashfield et al.
8,296,562 B2 10/2012 Williams et al.
8,302,164 B2 10/2012 Lunt
8,312,033 B1 11/2012 McMillan
8,315,940 B2 11/2012 Winbom et al.
8,327,429 B2 12/2012 Speyer et al.
8,359,278 B2 1/2013 Domenikos et al.
8,359,393 B2 1/2013 Metzger
8,374,634 B2 2/2013 Dankar et al.
8,374,973 B2 2/2013 Herbrich et al.
8,406,736 B2 3/2013 Das et al.
8,423,648 B2 4/2013 Ferguson et al.
8,442,886 B1 5/2013 Haggerty et al.
8,442,910 B2 5/2013 Morris et al.
8,443,202 B2 5/2013 White et al.
8,447,016 B1 5/2013 Kugler et al.
8,456,293 B1 6/2013 Trundle et al.
8,464,939 B1 6/2013 Taylor et al.
8,468,090 B2 6/2013 Lesandro et al.
8,468,198 B2 6/2013 Tomkow
8,468,199 B2 6/2013 Tomkow
8,478,674 B1 7/2013 Kapczynski et al.
8,478,981 B2 7/2013 Khan et al.
8,484,186 B1 7/2013 Kapczynski et al.
8,484,706 B2 7/2013 Tomkow
8,504,628 B2 8/2013 Tomkow
8,515,828 B1 8/2013 Wolf et al.
8,515,844 B2 8/2013 Kasower
8,527,357 B1 9/2013 Ganesan
8,527,417 B2 9/2013 Telle et al.
8,527,773 B1 9/2013 Metzger
8,528,078 B2 9/2013 Camaisa et al.
8,533,118 B2 9/2013 Weller et al.
8,533,791 B2 9/2013 Samuelsson et al.
8,549,590 B1 10/2013 de Villiers Prichard et al.
8,560,381 B2 10/2013 Green et al.
8,572,391 B2 10/2013 Golan et al.
8,578,496 B1 11/2013 Krishnappa
8,588,748 B2 11/2013 Buhrman et al.
8,600,886 B2 12/2013 Ramavarjula et al.
8,601,602 B1 12/2013 Zheng
8,606,234 B2 12/2013 Pei et al.
8,606,694 B2 12/2013 Campbell et al.
8,620,942 B1 12/2013 Hoffman et al.
8,630,938 B2 1/2014 Cheng et al.
8,645,275 B2 2/2014 Seifert et al.
8,646,051 B2 2/2014 Paden et al.
8,656,504 B2 2/2014 Lurey et al.
8,671,115 B2 3/2014 Skurtovich, Jr. et al.
8,688,543 B2 4/2014 Dominquez
8,689,311 B2 4/2014 Blinn et al.
8,695,105 B2 4/2014 Mahendrakar et al.
8,700,515 B2 4/2014 Duckworth et al.
8,701,199 B1 4/2014 Dotan et al.
8,705,718 B2 4/2014 Baniak et al.
8,706,599 B1 4/2014 Koenig et al.
8,713,651 B1 4/2014 Stibel
8,725,613 B1 5/2014 Celka et al.
8,738,934 B2 5/2014 Lurey et al.
8,744,956 B1 6/2014 DiChiara et al.
8,751,388 B1 6/2014 Chapa
8,762,287 B2 6/2014 Morley et al.
8,768,914 B2 7/2014 Scriffignano et al.
8,769,614 B1 7/2014 Knox et al.
8,781,882 B1 7/2014 Arboletti et al.
8,781,953 B2 7/2014 Kasower
8,781,975 B2 7/2014 Bennett et al.
8,782,154 B2 7/2014 Tomkow

(56) References Cited

U.S. PATENT DOCUMENTS

| | | | |
|---|---|---|---|
| 8,782,217 | B1 | 7/2014 | Arone et al. |
| 8,782,753 | B2 | 7/2014 | Lunt |
| 8,793,166 | B2 | 7/2014 | Mizhen |
| 8,793,509 | B1 | 7/2014 | Nelson et al. |
| 8,793,777 | B2 | 7/2014 | Colson |
| 8,800,005 | B2 | 8/2014 | Lunt |
| 8,806,584 | B2 | 8/2014 | Lunt |
| 8,818,888 | B1 | 8/2014 | Kapczynski et al. |
| 8,819,793 | B2 | 8/2014 | Gottschalk, Jr. |
| 8,826,371 | B2 | 9/2014 | Webb et al. |
| 8,826,393 | B2 | 9/2014 | Eisen |
| 8,831,564 | B2 | 9/2014 | Ferguson et al. |
| 8,839,394 | B2 | 9/2014 | Dennis et al. |
| 8,856,894 | B1 | 10/2014 | Dean et al. |
| 8,862,514 | B2 | 10/2014 | Eisen |
| 8,868,932 | B2 | 10/2014 | Lurey et al. |
| D717,332 | S | 11/2014 | Nies et al. |
| 8,931,058 | B2 | 1/2015 | DiChiara et al. |
| 8,938,399 | B1 | 1/2015 | Herman |
| 8,954,459 | B1 | 2/2015 | McMillan et al. |
| 8,972,400 | B1 | 3/2015 | Kapczynski et al. |
| 9,010,627 | B1 | 4/2015 | Prasad et al. |
| 9,043,886 | B2 | 5/2015 | Srinivasan et al. |
| 9,047,473 | B2 | 6/2015 | Samuelsson et al. |
| 9,100,400 | B2 | 8/2015 | Lunt |
| 9,106,691 | B1 | 8/2015 | Burger et al. |
| 9,124,606 | B2 | 9/2015 | Metzger |
| 9,147,042 | B1 | 9/2015 | Haller et al. |
| 9,147,117 | B1 | 9/2015 | Madhu et al. |
| 9,154,482 | B2 | 10/2015 | Dudziak et al. |
| 9,158,903 | B2 | 10/2015 | Metzger |
| 9,185,123 | B2 | 11/2015 | Dennis et al. |
| 9,195,984 | B1 | 11/2015 | Spector et al. |
| 9,195,985 | B2 | 11/2015 | Domenica et al. |
| 9,196,004 | B2 | 11/2015 | Eisen |
| 9,203,819 | B2 | 12/2015 | Fenton et al. |
| 9,215,223 | B2 | 12/2015 | Kirsch |
| 9,235,728 | B2 | 1/2016 | Gottschalk, Jr. et al. |
| 9,246,899 | B1 | 1/2016 | Durney et al. |
| 9,256,624 | B2 | 2/2016 | Skurtovich, Jr. et al. |
| 9,269,085 | B2 | 2/2016 | Webb et al. |
| 9,294,476 | B1 | 3/2016 | Lurey et al. |
| 9,344,413 | B2 | 5/2016 | Kirsch |
| 9,361,597 | B2 | 6/2016 | Britton et al. |
| 9,380,057 | B2 | 6/2016 | Knauss |
| 9,390,384 | B2 | 7/2016 | Eisen |
| 9,391,971 | B2 | 7/2016 | Lunt |
| 9,412,141 | B2 | 8/2016 | Prichard et al. |
| 9,420,448 | B2 | 8/2016 | Dankar et al. |
| 9,462,044 | B1 | 10/2016 | Preibisch et al. |
| 9,465,786 | B2 | 10/2016 | Lurey et al. |
| 9,467,445 | B2 | 10/2016 | Egan et al. |
| 9,491,160 | B2 | 11/2016 | Livesay et al. |
| 9,578,014 | B2 | 2/2017 | Sondhi et al. |
| 9,600,651 | B1 | 3/2017 | Ryan et al. |
| 9,607,336 | B1 | 3/2017 | Dean et al. |
| 9,626,680 | B1 | 4/2017 | Ryan et al. |
| 9,633,322 | B1 | 4/2017 | Burger |
| 9,641,521 | B2 | 5/2017 | Egan et al. |
| 9,665,854 | B1 | 5/2017 | Burger et al. |
| 9,684,905 | B1 | 6/2017 | Haller et al. |
| 9,697,521 | B2 | 7/2017 | Webb et al. |
| 9,706,402 | B2 | 7/2017 | Kueh |
| 9,710,523 | B2 | 7/2017 | Skurtovich, Jr. et al. |
| 9,721,147 | B1 | 8/2017 | Kapczynski |
| 9,734,501 | B2 | 8/2017 | Durney et al. |
| 9,754,256 | B2 | 9/2017 | Britton et al. |
| 9,754,311 | B2 | 9/2017 | Eisen |
| 9,760,885 | B1 | 9/2017 | Ramalingam et al. |
| 9,779,392 | B1 | 10/2017 | Prasad et al. |
| 9,818,121 | B2 | 11/2017 | Snyder et al. |
| 9,843,582 | B2 | 12/2017 | Mahendrakar et al. |
| 9,876,796 | B2 | 1/2018 | Egan et al. |
| 9,892,389 | B2 | 2/2018 | Domenica et al. |
| 10,075,446 | B2 | 9/2018 | McMillan et al. |
| 10,089,679 | B2 | 10/2018 | Eisen |
| 10,097,551 | B2 | 10/2018 | Chan et al. |
| 10,115,079 | B1 | 10/2018 | Burger et al. |
| 10,169,761 | B1 | 1/2019 | Burger |
| 10,200,277 | B2 | 2/2019 | Sreeramoju et al. |
| 10,277,569 | B1 | 4/2019 | Barbour et al. |
| 10,284,548 | B2 | 5/2019 | Williams et al. |
| 10,356,079 | B2 | 7/2019 | Lurey et al. |
| 10,373,240 | B1 | 8/2019 | Ross et al. |
| 10,380,565 | B1 | 8/2019 | Prasad |
| 10,395,053 | B2 | 8/2019 | Samid |
| 10,438,308 | B2 | 10/2019 | Prichard et al. |
| 10,453,159 | B2 | 10/2019 | Kapczynski |
| 10,616,196 | B1 | 4/2020 | Khitrenovich et al. |
| 10,637,646 | B2 | 4/2020 | Krishnamacharya et al. |
| 10,652,227 | B2 | 5/2020 | Spektor et al. |
| 10,664,936 | B2 | 5/2020 | Chapa et al. |
| 10,685,336 | B1 | 6/2020 | Burger et al. |
| 10,719,873 | B1 | 7/2020 | Dean et al. |
| 10,740,762 | B2 | 8/2020 | Burger |
| 10,742,541 | B2 | 8/2020 | Kim et al. |
| 10,771,463 | B2 | 9/2020 | Berezin et al. |
| 10,783,542 | B2 | 9/2020 | Walz et al. |
| 10,798,093 | B2 | 10/2020 | Kaliski, Jr. et al. |
| 10,798,096 | B2 | 10/2020 | Touati et al. |
| 10,863,359 | B2 | 12/2020 | Talwar |
| 10,891,618 | B2 | 1/2021 | Kinch et al. |
| 10,911,234 | B2 | 2/2021 | Jain et al. |
| 10,999,298 | B2 | 5/2021 | Eisen |
| 11,012,240 | B1 | 5/2021 | Kirsch |
| 11,074,641 | B1 | 7/2021 | Ross et al. |
| 11,095,643 | B2 | 8/2021 | Huffman et al. |
| 11,115,224 | B1 | 9/2021 | Scofield et al. |
| 11,120,519 | B2 | 9/2021 | Kapczynski |
| 11,128,464 | B1 | 9/2021 | Loladia |
| 11,146,676 | B2 | 10/2021 | Sena, Jr. et al. |
| 11,157,872 | B2 | 10/2021 | McMillan et al. |
| 11,164,178 | B2 | 11/2021 | Anderson et al. |
| 11,164,271 | B2 | 11/2021 | Chapa et al. |
| 11,178,128 | B2 | 11/2021 | Poschel et al. |
| 11,206,246 | B2 | 12/2021 | Krishnamacharya |
| 11,232,413 | B1 | 1/2022 | Burger et al. |
| 11,277,439 | B2 | 3/2022 | Knopf |
| 11,288,677 | B1 | 3/2022 | Burger |
| 11,290,255 | B2 | 3/2022 | Krishnamacharya et al. |
| 11,310,227 | B2 | 4/2022 | Hamburg et al. |
| 11,356,460 | B2 | 6/2022 | Bondugula et al. |
| 11,361,317 | B2 | 6/2022 | Billman et al. |
| 11,363,015 | B2 | 6/2022 | Yeddula et al. |
| 11,431,729 | B2 | 8/2022 | Bloomquist et al. |
| 11,449,630 | B2 | 9/2022 | Talwar |
| 11,470,069 | B2 | 10/2022 | Gillespie |
| 11,526,884 | B2 | 12/2022 | Chilaka et al. |
| 11,532,030 | B1 | 12/2022 | Smith |
| 11,544,363 | B2 | 1/2023 | Deore et al. |
| 11,551,226 | B2 | 1/2023 | Kumar |
| 11,587,150 | B1 | 2/2023 | Ross et al. |
| 11,588,639 | B2 | 2/2023 | Jain et al. |
| 11,651,095 | B2 | 5/2023 | Gupta et al. |
| 11,762,975 | B2 | 9/2023 | Allen |
| 11,765,145 | B2 | 9/2023 | Krishnamacharya |
| 11,769,112 | B2 | 9/2023 | McMillan et al. |
| 11,775,979 | B1 | 10/2023 | Burger |
| 11,784,791 | B2 | 10/2023 | Krishnamacharya et al. |
| 11,790,473 | B2 | 10/2023 | Chapa et al. |
| 11,803,929 | B1 | 10/2023 | Kapczynski |
| 11,818,272 | B2 | 11/2023 | Kirsch |
| 11,876,807 | B2 | 1/2024 | Bondugula et al. |
| 11,941,065 | B1 | 3/2024 | Li et al. |
| 11,954,655 | B1 | 4/2024 | Burger et al. |
| 12,003,540 | B1 | 6/2024 | Sharifi Mehr |
| 12,132,837 | B2 | 10/2024 | Jain et al. |
| 2001/0029482 | A1 | 10/2001 | Tealdi et al. |
| 2001/0039532 | A1 | 11/2001 | Coleman, Jr. et al. |
| 2001/0042785 | A1 | 11/2001 | Walker et al. |
| 2001/0044729 | A1 | 11/2001 | Pomerance |
| 2001/0044756 | A1 | 11/2001 | Watkins et al. |
| 2001/0049274 | A1 | 12/2001 | Degraeve |
| 2002/0002538 | A1 | 1/2002 | Ling |

(56) References Cited

U.S. PATENT DOCUMENTS

2002/0004736 A1 1/2002 Roundtree et al.
2002/0013827 A1 1/2002 Edstrom et al.
2002/0013899 A1 1/2002 Faul
2002/0026519 A1 2/2002 Itabashi et al.
2002/0026575 A1 2/2002 Wheeler et al.
2002/0032635 A1 3/2002 Harris et al.
2002/0033846 A1 3/2002 Balasubramanian et al.
2002/0045154 A1 4/2002 Wood et al.
2002/0052754 A1 5/2002 Joyce et al.
2002/0059201 A1 5/2002 Work
2002/0059521 A1 5/2002 Tasler
2002/0069122 A1 6/2002 Yun et al.
2002/0077964 A1 6/2002 Brody et al.
2002/0087460 A1 7/2002 Hornung
2002/0091544 A1* 7/2002 Middeljans .......... G06Q 20/123
705/39
2002/0091635 A1 7/2002 Dilip et al.
2002/0099635 A1 7/2002 Guiragosian
2002/0103933 A1 8/2002 Garon et al.
2002/0111816 A1 8/2002 Lortscher et al.
2002/0116247 A1 8/2002 Tucker et al.
2002/0120537 A1 8/2002 Morea et al.
2002/0120757 A1 8/2002 Sutherland et al.
2002/0120846 A1 8/2002 Stewart et al.
2002/0128962 A1 9/2002 Kasower
2002/0133365 A1 9/2002 Grey et al.
2002/0133462 A1 9/2002 Shteyn
2002/0138470 A1 9/2002 Zhou
2002/0143943 A1 10/2002 Lee et al.
2002/0147801 A1 10/2002 Gullotta et al.
2002/0157029 A1 10/2002 French et al.
2002/0164004 A1 11/2002 Tamura et al.
2002/0169747 A1 11/2002 Chapman et al.
2002/0173994 A1 11/2002 Ferguson, III
2002/0174048 A1 11/2002 Dheer et al.
2002/0184509 A1 12/2002 Scheidt et al.
2002/0198800 A1 12/2002 Shamrakov
2002/0198806 A1 12/2002 Blagg et al.
2002/0198824 A1 12/2002 Cook
2002/0198830 A1 12/2002 Randell et al.
2003/0002671 A1 1/2003 Inchalik et al.
2003/0009418 A1 1/2003 Green et al.
2003/0009426 A1 1/2003 Ruiz-Sanchez
2003/0023531 A1 1/2003 Fergusson
2003/0036995 A1 2/2003 Lazerson
2003/0041031 A1 2/2003 Hedy
2003/0046311 A1 3/2003 Baidya et al.
2003/0046554 A1 3/2003 Leydier et al.
2003/0048904 A1 3/2003 Wang et al.
2003/0061163 A1 3/2003 Durfield
2003/0069839 A1 4/2003 Whittington et al.
2003/0069943 A1 4/2003 Bahrs et al.
2003/0097342 A1 5/2003 Whittingtom
2003/0097380 A1 5/2003 Mulhern et al.
2003/0097573 A1 5/2003 Wheeler et al.
2003/0105710 A1 6/2003 Barbara et al.
2003/0105733 A1 6/2003 Boreham
2003/0105742 A1 6/2003 Boreham et al.
2003/0115133 A1 6/2003 Bian
2003/0115151 A1 6/2003 Wheeler et al.
2003/0131102 A1 7/2003 Umbreit
2003/0154162 A1 8/2003 Danaher et al.
2003/0158960 A1 8/2003 Engberg
2003/0163513 A1 8/2003 Schaeck et al.
2003/0163733 A1 8/2003 Barriga-Caceres et al.
2003/0171942 A1 9/2003 Gaito
2003/0177028 A1 9/2003 Cooper et al.
2003/0182214 A1 9/2003 Taylor
2003/0187837 A1 10/2003 Culliss
2003/0188193 A1 10/2003 Venkataramappa
2003/0195859 A1 10/2003 Lawrence
2003/0200447 A1 10/2003 Sjoblom
2003/0204429 A1 10/2003 Botscheck et al.
2003/0204752 A1 10/2003 Garrison
2003/0208412 A1 11/2003 Hillestad et al.
2003/0217094 A1 11/2003 Andrews et al.
2003/0220858 A1 11/2003 Lam et al.
2004/0002878 A1 1/2004 Hinton
2004/0006488 A1 1/2004 Fitall et al.
2004/0010458 A1 1/2004 Friedman
2004/0010698 A1 1/2004 Rolfe
2004/0015714 A1 1/2004 Abraham et al.
2004/0015715 A1 1/2004 Brown
2004/0019549 A1 1/2004 Gulbrandsen
2004/0019799 A1 1/2004 Vering et al.
2004/0024671 A1 2/2004 Freund
2004/0024709 A1 2/2004 Yu et al.
2004/0029601 A1 2/2004 O'Neill et al.
2004/0030649 A1 2/2004 Nelson et al.
2004/0039586 A1 2/2004 Garvey et al.
2004/0044628 A1 3/2004 Mathew et al.
2004/0044673 A1 3/2004 Brady et al.
2004/0044739 A1 3/2004 Ziegler
2004/0078324 A1 4/2004 Lonnberg et al.
2004/0083159 A1 4/2004 Crosby et al.
2004/0088237 A1 5/2004 Moenickheim et al.
2004/0088255 A1 5/2004 Zielke et al.
2004/0107250 A1 6/2004 Marciano
2004/0110119 A1 6/2004 Riconda et al.
2004/0111359 A1 6/2004 Hudock
2004/0111375 A1 6/2004 Johnson
2004/0117302 A1 6/2004 Weichert et al.
2004/0122681 A1 6/2004 Ruvolo et al.
2004/0122696 A1 6/2004 Beringer
2004/0122720 A1 6/2004 Mikalsen et al.
2004/0128150 A1 7/2004 Lundegren
2004/0128156 A1 7/2004 Beringer et al.
2004/0133440 A1 7/2004 Carolan et al.
2004/0133441 A1 7/2004 Brady et al.
2004/0133509 A1 7/2004 McCoy et al.
2004/0133513 A1 7/2004 McCoy et al.
2004/0133515 A1 7/2004 McCoy et al.
2004/0138994 A1 7/2004 DeFrancesco et al.
2004/0139009 A1 7/2004 Kozee et al.
2004/0139010 A1 7/2004 McMichael et al.
2004/0139011 A1 7/2004 Kozee et al.
2004/0141005 A1 7/2004 Banatwala et al.
2004/0143546 A1 7/2004 Wood et al.
2004/0143596 A1 7/2004 Sirkin
2004/0153521 A1 8/2004 Kogo
2004/0158523 A1 8/2004 Dort
2004/0158723 A1 8/2004 Root
2004/0159700 A1 8/2004 Khan et al.
2004/0167793 A1 8/2004 Masuoka et al.
2004/0167834 A1 8/2004 Koskinen et al.
2004/0193891 A1 9/2004 Ollila
2004/0199789 A1 10/2004 Shaw et al.
2004/0210661 A1 10/2004 Thompson
2004/0220865 A1 11/2004 Lozowski et al.
2004/0220918 A1 11/2004 Scriffignano et al.
2004/0225643 A1 11/2004 Alpha et al.
2004/0230527 A1 11/2004 Hansen et al.
2004/0243514 A1 12/2004 Wankmueller
2004/0243518 A1 12/2004 Clifton et al.
2004/0243588 A1 12/2004 Tanner et al.
2004/0243832 A1 12/2004 Wilf et al.
2004/0249789 A1 12/2004 Kapoor et al.
2004/0249811 A1 12/2004 Shostack
2004/0250085 A1 12/2004 Tattan et al.
2004/0250107 A1 12/2004 Guo
2004/0254935 A1 12/2004 Chagoly et al.
2004/0255127 A1 12/2004 Arnouse
2004/0267714 A1 12/2004 Frid et al.
2005/0005168 A1 1/2005 Dick
2005/0010513 A1 1/2005 Duckworth et al.
2005/0021476 A1 1/2005 Candella et al.
2005/0021551 A1 1/2005 Silva et al.
2005/0027983 A1 2/2005 Klawon
2005/0027995 A1 2/2005 Menschik et al.
2005/0055231 A1 3/2005 Lee
2005/0058262 A1 3/2005 Timmins et al.
2005/0060332 A1 3/2005 Bernstein et al.
2005/0071328 A1 3/2005 Lawrence
2005/0075985 A1 4/2005 Cartmell

(56) References Cited

U.S. PATENT DOCUMENTS

| | | | |
|---|---|---|---|
| 2005/0086126 | A1 | 4/2005 | Patterson |
| 2005/0086297 | A1 | 4/2005 | Hinks |
| 2005/0091164 | A1 | 4/2005 | Varble |
| 2005/0097017 | A1 | 5/2005 | Hanratty |
| 2005/0097039 | A1 | 5/2005 | Kulcsar et al. |
| 2005/0097320 | A1 | 5/2005 | Golan et al. |
| 2005/0102180 | A1 | 5/2005 | Gailey et al. |
| 2005/0105719 | A1 | 5/2005 | Huda |
| 2005/0108396 | A1 | 5/2005 | Bittner |
| 2005/0108631 | A1 | 5/2005 | Amorin et al. |
| 2005/0114335 | A1 | 5/2005 | Wesinger, Jr. et al. |
| 2005/0114344 | A1 | 5/2005 | Wesinger, Jr. et al. |
| 2005/0114345 | A1 | 5/2005 | Wesinger, Jr. et al. |
| 2005/0117535 | A1 | 6/2005 | Mahonen |
| 2005/0119978 | A1 | 6/2005 | Ates |
| 2005/0125291 | A1 | 6/2005 | Demkiw Grayson et al. |
| 2005/0125397 | A1 | 6/2005 | Gross et al. |
| 2005/0125686 | A1 | 6/2005 | Brandt |
| 2005/0137899 | A1 | 6/2005 | Davies et al. |
| 2005/0138391 | A1 | 6/2005 | Mandalia et al. |
| 2005/0138553 | A1 | 6/2005 | Ballard et al. |
| 2005/0138648 | A1 | 6/2005 | Ahmed et al. |
| 2005/0144133 | A1 | 6/2005 | Hoffman et al. |
| 2005/0154664 | A1 | 7/2005 | Guy et al. |
| 2005/0154665 | A1 | 7/2005 | Kerr |
| 2005/0154769 | A1 | 7/2005 | Eckart et al. |
| 2005/0166262 | A1 | 7/2005 | Beattie et al. |
| 2005/0171884 | A1 | 8/2005 | Arnott |
| 2005/0181765 | A1 | 8/2005 | Mark |
| 2005/0208461 | A1 | 9/2005 | Krebs et al. |
| 2005/0216434 | A1 | 9/2005 | Haveliwala et al. |
| 2005/0216582 | A1 | 9/2005 | Toomey et al. |
| 2005/0216953 | A1 | 9/2005 | Ellingson |
| 2005/0216955 | A1 | 9/2005 | Wilkins et al. |
| 2005/0226224 | A1 | 10/2005 | Lee et al. |
| 2005/0240578 | A1 | 10/2005 | Biederman et al. |
| 2005/0256809 | A1 | 11/2005 | Sadri |
| 2005/0267840 | A1 | 12/2005 | Holm-Blagg et al. |
| 2005/0273431 | A1 | 12/2005 | Abel et al. |
| 2005/0288998 | A1 | 12/2005 | Verma et al. |
| 2006/0004623 | A1 | 1/2006 | Jasti |
| 2006/0004626 | A1 | 1/2006 | Holmen et al. |
| 2006/0010072 | A1 | 1/2006 | Eisen |
| 2006/0010391 | A1 | 1/2006 | Uemura et al. |
| 2006/0010487 | A1 | 1/2006 | Fierer et al. |
| 2006/0016107 | A1 | 1/2006 | Davis |
| 2006/0032909 | A1 | 2/2006 | Seegar |
| 2006/0036543 | A1 | 2/2006 | Blagg et al. |
| 2006/0036748 | A1 | 2/2006 | Nusbaum et al. |
| 2006/0036870 | A1 | 2/2006 | Dasari et al. |
| 2006/0041464 | A1 | 2/2006 | Powers et al. |
| 2006/0041670 | A1 | 2/2006 | Musseleck et al. |
| 2006/0059110 | A1 | 3/2006 | Madhok et al. |
| 2006/0059362 | A1 | 3/2006 | Paden et al. |
| 2006/0069635 | A1 | 3/2006 | Ram et al. |
| 2006/0074986 | A1 | 4/2006 | Mallalieu et al. |
| 2006/0074991 | A1 | 4/2006 | Lussier et al. |
| 2006/0079211 | A1 | 4/2006 | Degraeve |
| 2006/0080230 | A1 | 4/2006 | Freiberg |
| 2006/0080251 | A1 | 4/2006 | Fried et al. |
| 2006/0080263 | A1 | 4/2006 | Willis et al. |
| 2006/0085361 | A1 | 4/2006 | Hoerle et al. |
| 2006/0101508 | A1 | 5/2006 | Taylor |
| 2006/0129419 | A1 | 6/2006 | Flaxer et al. |
| 2006/0129481 | A1 | 6/2006 | Bhatt et al. |
| 2006/0129533 | A1 | 6/2006 | Purvis |
| 2006/0131390 | A1 | 6/2006 | Kim |
| 2006/0136595 | A1 | 6/2006 | Satyavolu |
| 2006/0140460 | A1 | 6/2006 | Coutts |
| 2006/0155573 | A1 | 7/2006 | Hartunian |
| 2006/0155780 | A1 | 7/2006 | Sakairi et al. |
| 2006/0161435 | A1 | 7/2006 | Atef et al. |
| 2006/0161554 | A1 | 7/2006 | Lucovsky et al. |
| 2006/0173776 | A1 | 8/2006 | Shalley et al. |
| 2006/0173792 | A1 | 8/2006 | Glass |
| 2006/0178971 | A1 | 8/2006 | Owen et al. |
| 2006/0179050 | A1 | 8/2006 | Giang et al. |
| 2006/0184585 | A1 | 8/2006 | Grear et al. |
| 2006/0195351 | A1 | 8/2006 | Bayburtian |
| 2006/0204051 | A1 | 9/2006 | Holland |
| 2006/0212407 | A1 | 9/2006 | Lyon |
| 2006/0218407 | A1 | 9/2006 | Toms |
| 2006/0229943 | A1 | 10/2006 | Mathias et al. |
| 2006/0229961 | A1 | 10/2006 | Lyftogt et al. |
| 2006/0235935 | A1 | 10/2006 | Ng |
| 2006/0239512 | A1 | 10/2006 | Petrillo |
| 2006/0253294 | A1 | 11/2006 | Martti et al. |
| 2006/0253358 | A1 | 11/2006 | Delgrosso et al. |
| 2006/0256729 | A1 | 11/2006 | Chen et al. |
| 2006/0262929 | A1 | 11/2006 | Vatanen et al. |
| 2006/0265243 | A1 | 11/2006 | Racho et al. |
| 2006/0271456 | A1 | 11/2006 | Romain et al. |
| 2006/0271457 | A1 | 11/2006 | Romain et al. |
| 2006/0271633 | A1 | 11/2006 | Adler |
| 2006/0277089 | A1 | 12/2006 | Hubbard et al. |
| 2006/0282429 | A1 | 12/2006 | Hernandez-Sherrington et al. |
| 2006/0282660 | A1 | 12/2006 | Varghese et al. |
| 2006/0282819 | A1 | 12/2006 | Graham et al. |
| 2006/0287764 | A1 | 12/2006 | Kraft |
| 2006/0287765 | A1 | 12/2006 | Kraft |
| 2006/0287766 | A1 | 12/2006 | Kraft |
| 2006/0287767 | A1 | 12/2006 | Kraft |
| 2006/0288090 | A1 | 12/2006 | Kraft |
| 2006/0294199 | A1 | 12/2006 | Bertholf |
| 2007/0005508 | A1 | 1/2007 | Chiang |
| 2007/0005984 | A1 | 1/2007 | Florencio et al. |
| 2007/0022141 | A1 | 1/2007 | Singleton et al. |
| 2007/0027816 | A1 | 2/2007 | Writer |
| 2007/0032240 | A1 | 2/2007 | Finnegan et al. |
| 2007/0038568 | A1 | 2/2007 | Greene et al. |
| 2007/0043577 | A1 | 2/2007 | Kasower |
| 2007/0047714 | A1 | 3/2007 | Baniak et al. |
| 2007/0055672 | A1 | 3/2007 | Stevens |
| 2007/0055785 | A1 | 3/2007 | Stevens |
| 2007/0060367 | A1 | 3/2007 | Heler |
| 2007/0067297 | A1 | 3/2007 | Kublickis |
| 2007/0072190 | A1 | 3/2007 | Aggarwal |
| 2007/0073889 | A1 | 3/2007 | Morris |
| 2007/0078908 | A1 | 4/2007 | Rohatgi et al. |
| 2007/0078985 | A1 | 4/2007 | Shao et al. |
| 2007/0083460 | A1 | 4/2007 | Bachenheimer |
| 2007/0083463 | A1 | 4/2007 | Kraft |
| 2007/0093234 | A1 | 4/2007 | Willis et al. |
| 2007/0094142 | A1 | 4/2007 | Russell et al. |
| 2007/0094230 | A1 | 4/2007 | Subramaniam et al. |
| 2007/0094241 | A1 | 4/2007 | M. Blackwell et al. |
| 2007/0106904 | A1 | 4/2007 | Russell et al. |
| 2007/0112667 | A1 | 5/2007 | Rucker |
| 2007/0112668 | A1 | 5/2007 | Celano et al. |
| 2007/0121843 | A1 | 5/2007 | Atazky et al. |
| 2007/0124256 | A1 | 5/2007 | Crooks et al. |
| 2007/0143825 | A1 | 6/2007 | Goffin |
| 2007/0156692 | A1 | 7/2007 | Rosewarne |
| 2007/0156758 | A1 | 7/2007 | Adiga |
| 2007/0162307 | A1 | 7/2007 | Austin et al. |
| 2007/0174186 | A1 | 7/2007 | Hokland |
| 2007/0174448 | A1 | 7/2007 | Ahuja et al. |
| 2007/0174903 | A1 | 7/2007 | Greff |
| 2007/0192121 | A1 | 8/2007 | Routson et al. |
| 2007/0192853 | A1 | 8/2007 | Shraim et al. |
| 2007/0198432 | A1 | 8/2007 | Pitroda et al. |
| 2007/0198433 | A1 | 8/2007 | McGee et al. |
| 2007/0204338 | A1 | 8/2007 | Aiello et al. |
| 2007/0205266 | A1 | 9/2007 | Carr et al. |
| 2007/0206515 | A1 | 9/2007 | Andreasen et al. |
| 2007/0220604 | A1 | 9/2007 | Long |
| 2007/0226122 | A1 | 9/2007 | Burrell et al. |
| 2007/0240206 | A1 | 10/2007 | Wu et al. |
| 2007/0244807 | A1 | 10/2007 | Andringa et al. |
| 2007/0245245 | A1 | 10/2007 | Blue et al. |
| 2007/0250441 | A1 | 10/2007 | Paulsen et al. |
| 2007/0250459 | A1 | 10/2007 | Schwarz et al. |
| 2007/0261108 | A1 | 11/2007 | Lee et al. |
| 2007/0261114 | A1 | 11/2007 | Pomerantsev |

(56) References Cited

U.S. PATENT DOCUMENTS

2007/0266439 A1 11/2007 Kraft
2007/0282743 A1 12/2007 Lovelett
2007/0282959 A1 12/2007 Stern
2007/0288355 A1 12/2007 Roland et al.
2007/0288360 A1 12/2007 Seeklus
2007/0294195 A1 12/2007 Curry et al.
2008/0010203 A1 1/2008 Grant
2008/0010206 A1 1/2008 Coleman
2008/0010687 A1 1/2008 Gonen et al.
2008/0025208 A1 1/2008 Chan
2008/0028446 A1 1/2008 Burgoyne
2008/0033742 A1 2/2008 Bernasconi
2008/0033956 A1 2/2008 Saha et al.
2008/0040610 A1 2/2008 Fergusson
2008/0040717 A1 2/2008 Hobson
2008/0047017 A1 2/2008 Renaud
2008/0052182 A1 2/2008 Marshall
2008/0052244 A1 2/2008 Tsuei et al.
2008/0059364 A1 3/2008 Tidwell et al.
2008/0066188 A1 3/2008 Kwak
2008/0072316 A1 3/2008 Chang et al.
2008/0077526 A1 3/2008 Arumugam
2008/0082536 A1 4/2008 Schwabe et al.
2008/0083021 A1 4/2008 Doane et al.
2008/0086431 A1 4/2008 Robinson et al.
2008/0091530 A1 4/2008 Egnatios et al.
2008/0103800 A1 5/2008 Domenikos et al.
2008/0103972 A1 5/2008 Lanc
2008/0104672 A1 5/2008 Lunde et al.
2008/0104674 A1 5/2008 Sherkin et al.
2008/0109422 A1 5/2008 Dedhia
2008/0109875 A1 5/2008 Kraft
2008/0114670 A1 5/2008 Friesen
2008/0115191 A1 5/2008 Kim et al.
2008/0115226 A1 5/2008 Welingkar et al.
2008/0120196 A1 5/2008 Reed et al.
2008/0120400 A1 5/2008 Keller et al.
2008/0120569 A1 5/2008 Mann et al.
2008/0120617 A1 5/2008 Keller et al.
2008/0120716 A1 5/2008 Hall et al.
2008/0126233 A1 5/2008 Hogan
2008/0141346 A1 6/2008 Kay et al.
2008/0148368 A1 6/2008 Zurko et al.
2008/0154758 A1 6/2008 Schattmaier et al.
2008/0155686 A1 6/2008 McNair
2008/0162317 A1 7/2008 Banaugh et al.
2008/0162350 A1 7/2008 Allen-Rouman et al.
2008/0162383 A1 7/2008 Kraft
2008/0175360 A1 7/2008 Schwarz et al.
2008/0183480 A1 7/2008 Carlson et al.
2008/0183585 A1 7/2008 Vianello
2008/0195548 A1 8/2008 Chu et al.
2008/0201401 A1 8/2008 Pugh et al.
2008/0205655 A1 8/2008 Wilkins et al.
2008/0208726 A1 8/2008 Tsantes et al.
2008/0208735 A1 8/2008 Balet et al.
2008/0208752 A1* 8/2008 Gottlieb ............... H04N 21/472
705/77
2008/0208873 A1 8/2008 Boehmer
2008/0212845 A1 9/2008 Lund
2008/0215427 A1 9/2008 Kawada et al.
2008/0216156 A1 9/2008 Kosaka
2008/0222706 A1 9/2008 Renaud et al.
2008/0222722 A1 9/2008 Navratil et al.
2008/0229415 A1 9/2008 Kapoor et al.
2008/0249869 A1 10/2008 Angell et al.
2008/0255992 A1 10/2008 Lin
2008/0256613 A1 10/2008 Grover
2008/0263058 A1 10/2008 Peden
2008/0270295 A1 10/2008 Lent et al.
2008/0270299 A1 10/2008 Peng
2008/0281621 A1 11/2008 Shan et al.
2008/0281737 A1 11/2008 Fajardo
2008/0288283 A1 11/2008 Baldwin, Jr. et al.
2008/0288299 A1 11/2008 Schultz
2008/0288405 A1 11/2008 John
2008/0301016 A1 12/2008 Durvasula et al.
2008/0306750 A1 12/2008 Wunder et al.
2008/0314977 A1 12/2008 Domenica et al.
2008/0319889 A1 12/2008 Hammad
2009/0006230 A1 1/2009 Lyda et al.
2009/0018986 A1 1/2009 Alcorn et al.
2009/0031426 A1 1/2009 Dal Lago et al.
2009/0037332 A1 2/2009 Cheung et al.
2009/0043691 A1 2/2009 Kasower
2009/0055298 A1 2/2009 Foll
2009/0055322 A1 2/2009 Bykov et al.
2009/0055894 A1 2/2009 Lorsch
2009/0064297 A1 3/2009 Selgas et al.
2009/0089128 A1 4/2009 Tkatch et al.
2009/0094237 A1 4/2009 Churi et al.
2009/0094674 A1 4/2009 Schwartz et al.
2009/0100047 A1 4/2009 Jones et al.
2009/0106141 A1 4/2009 Becker
2009/0106150 A1 4/2009 Pelegero et al.
2009/0106846 A1* 4/2009 Dupray .................. G06Q 40/02
726/26
2009/0119299 A1 5/2009 Rhodes
2009/0125369 A1 5/2009 Kloostra et al.
2009/0125972 A1 5/2009 Hinton et al.
2009/0132347 A1 5/2009 Anderson et al.
2009/0138335 A1 5/2009 Lieberman
2009/0138895 A1 5/2009 Dumas et al.
2009/0144166 A1 6/2009 Dickelman
2009/0150166 A1 6/2009 Leite et al.
2009/0150238 A1 6/2009 Marsh et al.
2009/0157564 A1 6/2009 Cross
2009/0157693 A1 6/2009 Palahnuk
2009/0158030 A1 6/2009 Rasti
2009/0164232 A1 6/2009 Chmielewski et al.
2009/0164380 A1 6/2009 Brown
2009/0169019 A1 7/2009 Bauchot et al.
2009/0172788 A1 7/2009 Veldula et al.
2009/0172795 A1 7/2009 Ritari et al.
2009/0177529 A1 7/2009 Hadi
2009/0177562 A1 7/2009 Peace et al.
2009/0183259 A1 7/2009 Rinek et al.
2009/0199264 A1 8/2009 Lang
2009/0199294 A1 8/2009 Schneider
2009/0204514 A1 8/2009 Bhogal et al.
2009/0204599 A1 8/2009 Morris et al.
2009/0210241 A1 8/2009 Calloway
2009/0210347 A1 8/2009 Sarcanin
2009/0210807 A1 8/2009 Xiao et al.
2009/0215431 A1 8/2009 Koraichi
2009/0216640 A1 8/2009 Masi
2009/0222449 A1 9/2009 Hom et al.
2009/0228918 A1 9/2009 Rolff et al.
2009/0234665 A1 9/2009 Conkel
2009/0234775 A1 9/2009 Whitney et al.
2009/0234876 A1 9/2009 Schigel et al.
2009/0240624 A1 9/2009 James et al.
2009/0247122 A1 10/2009 Fitzgerald et al.
2009/0252134 A1 10/2009 Schlicht et al.
2009/0254375 A1 10/2009 Martinez et al.
2009/0254476 A1 10/2009 Sharma et al.
2009/0254572 A1 10/2009 Redlich et al.
2009/0254656 A1 10/2009 Vignisson et al.
2009/0254971 A1 10/2009 Herz et al.
2009/0260064 A1 10/2009 Mcdowell et al.
2009/0271847 A1 10/2009 Karjala et al.
2009/0276269 A1 11/2009 Yee et al.
2009/0307778 A1 12/2009 Mardikar
2009/0313134 A1 12/2009 Faith et al.
2009/0313562 A1 12/2009 Appleyard et al.
2009/0319638 A1 12/2009 Faith et al.
2009/0327270 A1 12/2009 Teevan et al.
2009/0328173 A1 12/2009 Jakobson et al.
2010/0011428 A1 1/2010 Atwood et al.
2010/0030578 A1 2/2010 Siddique et al.
2010/0030677 A1 2/2010 Melik-Aslanian et al.
2010/0042542 A1 2/2010 Rose et al.
2010/0043055 A1 2/2010 Baumgart
2010/0049803 A1 2/2010 Ogilvie et al.

(56) References Cited

U.S. PATENT DOCUMENTS

| | | | |
|---|---|---|---|
| 2010/0057560 | A1 | 3/2010 | Skudlark et al. |
| 2010/0058404 | A1 | 3/2010 | Rouse |
| 2010/0063942 | A1 | 3/2010 | Arnott et al. |
| 2010/0063993 | A1 | 3/2010 | Higgins et al. |
| 2010/0076836 | A1 | 3/2010 | Giordano et al. |
| 2010/0077351 | A1 | 3/2010 | Kaulgud et al. |
| 2010/0077483 | A1 | 3/2010 | Stolfo et al. |
| 2010/0083371 | A1 | 4/2010 | Bennetts et al. |
| 2010/0088233 | A1 | 4/2010 | Tattan et al. |
| 2010/0094768 | A1 | 4/2010 | Miltonberger |
| 2010/0094910 | A1 | 4/2010 | Bayliss |
| 2010/0100945 | A1 | 4/2010 | Ozzie et al. |
| 2010/0114744 | A1 | 5/2010 | Gonen |
| 2010/0114776 | A1 | 5/2010 | Weller et al. |
| 2010/0121767 | A1 | 5/2010 | Coulter et al. |
| 2010/0122305 | A1 | 5/2010 | Moloney |
| 2010/0122324 | A1 | 5/2010 | Welingkar et al. |
| 2010/0122333 | A1 | 5/2010 | Noe et al. |
| 2010/0130172 | A1 | 5/2010 | Vendrow et al. |
| 2010/0136956 | A1 | 6/2010 | Drachev et al. |
| 2010/0138298 | A1 | 6/2010 | Fitzherald et al. |
| 2010/0145836 | A1 | 6/2010 | Baker et al. |
| 2010/0153278 | A1 | 6/2010 | Farsedakis |
| 2010/0153290 | A1 | 6/2010 | Duggan |
| 2010/0161816 | A1 | 6/2010 | Kraft et al. |
| 2010/0169159 | A1 | 7/2010 | Rose et al. |
| 2010/0174638 | A1 | 7/2010 | Debie et al. |
| 2010/0174813 | A1 | 7/2010 | Hildreth et al. |
| 2010/0175119 | A1 | 7/2010 | Vitaletti |
| 2010/0179906 | A1 | 7/2010 | Hawkes |
| 2010/0185546 | A1 | 7/2010 | Pollard |
| 2010/0205076 | A1 | 8/2010 | Parson et al. |
| 2010/0205662 | A1 | 8/2010 | Ibrahim et al. |
| 2010/0211445 | A1 | 8/2010 | Bodington |
| 2010/0211636 | A1 | 8/2010 | Starkenburg et al. |
| 2010/0212004 | A1 | 8/2010 | Fu |
| 2010/0217837 | A1 | 8/2010 | Ansari et al. |
| 2010/0217969 | A1 | 8/2010 | Tomkow |
| 2010/0223192 | A1 | 9/2010 | Levine et al. |
| 2010/0229245 | A1 | 9/2010 | Singhal |
| 2010/0241493 | A1 | 9/2010 | Onischuk |
| 2010/0241535 | A1 | 9/2010 | Nightengale et al. |
| 2010/0250338 | A1 | 9/2010 | Banerjee et al. |
| 2010/0250410 | A1 | 9/2010 | Song et al. |
| 2010/0250411 | A1 | 9/2010 | Ogrodski |
| 2010/0250955 | A1 | 9/2010 | Trevithick et al. |
| 2010/0257102 | A1 | 10/2010 | Perlman |
| 2010/0258623 | A1 | 10/2010 | Beemer et al. |
| 2010/0262932 | A1 | 10/2010 | Pan |
| 2010/0280914 | A1 | 11/2010 | Carlson |
| 2010/0281020 | A1 | 11/2010 | Drubner |
| 2010/0287541 | A1 | 11/2010 | Saunders et al. |
| 2010/0293049 | A1 | 11/2010 | Maher et al. |
| 2010/0293050 | A1 | 11/2010 | Maher et al. |
| 2010/0293058 | A1 | 11/2010 | Maher et al. |
| 2010/0293090 | A1 | 11/2010 | Domenikos et al. |
| 2010/0299262 | A1 | 11/2010 | Handler |
| 2010/0325442 | A1 | 12/2010 | Petrone et al. |
| 2010/0325694 | A1 | 12/2010 | Bhagavatula et al. |
| 2010/0332393 | A1 | 12/2010 | Weller et al. |
| 2011/0004498 | A1 | 1/2011 | Readshaw |
| 2011/0016533 | A1 | 1/2011 | Zeigler et al. |
| 2011/0023115 | A1 | 1/2011 | Wright |
| 2011/0029388 | A1 | 2/2011 | Kendall et al. |
| 2011/0040736 | A1 | 2/2011 | Kalaboukis |
| 2011/0071950 | A1 | 3/2011 | Ivanovic |
| 2011/0082768 | A1 | 4/2011 | Eisen |
| 2011/0083181 | A1 | 4/2011 | Nazarov |
| 2011/0113084 | A1 | 5/2011 | Ramnani |
| 2011/0119155 | A1 | 5/2011 | Hammad et al. |
| 2011/0126024 | A1 | 5/2011 | Beatson et al. |
| 2011/0126275 | A1 | 5/2011 | Anderson et al. |
| 2011/0131096 | A1 | 6/2011 | Frew et al. |
| 2011/0131123 | A1 | 6/2011 | Griffin et al. |
| 2011/0137760 | A1 | 6/2011 | Rudie et al. |
| 2011/0142213 | A1 | 6/2011 | Baniak et al. |
| 2011/0145899 | A1 | 6/2011 | Cao et al. |
| 2011/0148625 | A1 | 6/2011 | Velusamy |
| 2011/0161218 | A1 | 6/2011 | Swift |
| 2011/0166988 | A1 | 7/2011 | Coulter |
| 2011/0167011 | A1 | 7/2011 | Paltenghe et al. |
| 2011/0173681 | A1 | 7/2011 | Qureshi et al. |
| 2011/0179139 | A1 | 7/2011 | Starkenburg et al. |
| 2011/0184780 | A1 | 7/2011 | Alderson et al. |
| 2011/0184838 | A1 | 7/2011 | Winters et al. |
| 2011/0188387 | A1 | 8/2011 | Das et al. |
| 2011/0196791 | A1 | 8/2011 | Dominguez |
| 2011/0208601 | A1 | 8/2011 | Ferguson et al. |
| 2011/0211445 | A1 | 9/2011 | Chen |
| 2011/0260832 | A1 | 10/2011 | Ross et al. |
| 2011/0264566 | A1 | 10/2011 | Brown |
| 2011/0270754 | A1 | 11/2011 | Kelly et al. |
| 2011/0289094 | A1 | 11/2011 | Fisher |
| 2011/0307397 | A1 | 12/2011 | Benmbarek |
| 2011/0307957 | A1 | 12/2011 | Barcelo et al. |
| 2012/0011158 | A1 | 1/2012 | Avner et al. |
| 2012/0016948 | A1 | 1/2012 | Sinha |
| 2012/0018506 | A1 | 1/2012 | Hammad et al. |
| 2012/0030216 | A1 | 2/2012 | Churi et al. |
| 2012/0030771 | A1 | 2/2012 | Pierson et al. |
| 2012/0047219 | A1 | 2/2012 | Feng et al. |
| 2012/0047423 | A1 | 2/2012 | Tomkow |
| 2012/0054592 | A1 | 3/2012 | Jaffe et al. |
| 2012/0072382 | A1 | 3/2012 | Pearson et al. |
| 2012/0079585 | A1 | 3/2012 | Chan et al. |
| 2012/0084866 | A1 | 4/2012 | Stolfo |
| 2012/0089438 | A1 | 4/2012 | Tavares et al. |
| 2012/0108274 | A1 | 5/2012 | Acebo Ruiz et al. |
| 2012/0110467 | A1 | 5/2012 | Blake et al. |
| 2012/0110677 | A1 | 5/2012 | Abendroth et al. |
| 2012/0117629 | A1 | 5/2012 | Miyazawa et al. |
| 2012/0124498 | A1 | 5/2012 | Santoro et al. |
| 2012/0130898 | A1 | 5/2012 | Snyder et al. |
| 2012/0136763 | A1 | 5/2012 | Megdal et al. |
| 2012/0151045 | A1 | 6/2012 | Anakata et al. |
| 2012/0173339 | A1 | 7/2012 | Flynt et al. |
| 2012/0173563 | A1 | 7/2012 | Griffin et al. |
| 2012/0191610 | A1 | 7/2012 | Prasad |
| 2012/0215682 | A1 | 8/2012 | Lent et al. |
| 2012/0215719 | A1 | 8/2012 | Verlander |
| 2012/0215758 | A1 | 8/2012 | Gottschalk, Jr. et al. |
| 2012/0216125 | A1 | 8/2012 | Pierce |
| 2012/0235897 | A1 | 9/2012 | Hirota |
| 2012/0239497 | A1 | 9/2012 | Nuzzi |
| 2012/0246060 | A1 | 9/2012 | Conyack, Jr. et al. |
| 2012/0246730 | A1 | 9/2012 | Raad |
| 2012/0253852 | A1 | 10/2012 | Pourfallah et al. |
| 2012/0290660 | A1 | 11/2012 | Rao et al. |
| 2012/0297484 | A1 | 11/2012 | Srivastava |
| 2012/0303514 | A1 | 11/2012 | Kasower |
| 2012/0323717 | A1 | 12/2012 | Kirsch |
| 2012/0331557 | A1 | 12/2012 | Washington |
| 2013/0004033 | A1 | 1/2013 | Trugenberger et al. |
| 2013/0006843 | A1 | 1/2013 | Tralvex |
| 2013/0018811 | A1 | 1/2013 | Britti et al. |
| 2013/0031109 | A1 | 1/2013 | Roulson et al. |
| 2013/0031624 | A1 | 1/2013 | Britti et al. |
| 2013/0041701 | A1 | 2/2013 | Roth |
| 2013/0066775 | A1 | 3/2013 | Milam |
| 2013/0080467 | A1 | 3/2013 | Carson et al. |
| 2013/0085804 | A1 | 4/2013 | Leff et al. |
| 2013/0085939 | A1 | 4/2013 | Colak et al. |
| 2013/0086186 | A1 | 4/2013 | Tomkow |
| 2013/0086654 | A1 | 4/2013 | Tomkow |
| 2013/0110678 | A1 | 5/2013 | Vigier et al. |
| 2013/0117087 | A1 | 5/2013 | Coppinger |
| 2013/0117387 | A1 | 5/2013 | Tomkow |
| 2013/0125010 | A1 | 5/2013 | Strandell |
| 2013/0132151 | A1 | 5/2013 | Stibel et al. |
| 2013/0139229 | A1 | 5/2013 | Fried et al. |
| 2013/0173449 | A1 | 7/2013 | Ng et al. |
| 2013/0179955 | A1 | 7/2013 | Bekker et al. |
| 2013/0198525 | A1 | 8/2013 | Spies et al. |
| 2013/0205135 | A1 | 8/2013 | Lutz |

(56) References Cited

U.S. PATENT DOCUMENTS

2013/0212661 A1 8/2013 Neafsey et al.
2013/0246150 A1 9/2013 Ovick et al.
2013/0246273 A1 9/2013 Ovick et al.
2013/0246528 A1 9/2013 Ogura
2013/0254008 A1 9/2013 Ovick et al.
2013/0254096 A1 9/2013 Serio et al.
2013/0268333 A1 10/2013 Ovick et al.
2013/0271272 A1 10/2013 Dhesi et al.
2013/0275762 A1 10/2013 Tomkow
2013/0279676 A1 10/2013 Baniak et al.
2013/0282461 A1 10/2013 Ovick et al.
2013/0290097 A1 10/2013 Balestrieri et al.
2013/0293363 A1 11/2013 Plymouth
2013/0298238 A1 11/2013 Shah et al.
2013/0318569 A1 11/2013 Canning et al.
2013/0332342 A1 12/2013 Kasower
2013/0339217 A1 12/2013 Breslow et al.
2013/0339249 A1 12/2013 Weller et al.
2013/0346331 A1 12/2013 Giovannetti et al.
2014/0012733 A1 1/2014 Vidal
2014/0013396 A1 1/2014 Field-Eliot et al.
2014/0025475 A1 1/2014 Burke
2014/0032723 A1 1/2014 Nema
2014/0033280 A1 1/2014 Nimashakavi et al.
2014/0040051 A1 2/2014 Ovick et al.
2014/0040135 A1 2/2014 Ovick et al.
2014/0046872 A1 2/2014 Arnott et al.
2014/0051464 A1 2/2014 Ryan et al.
2014/0061302 A1 3/2014 Hammad
2014/0089167 A1 3/2014 Kasower
2014/0110477 A1 4/2014 Hammad
2014/0162611 A1 6/2014 Mezhibovsky et al.
2014/0164112 A1 6/2014 Kala
2014/0164398 A1 6/2014 Smith et al.
2014/0164519 A1 6/2014 Shah
2014/0201100 A1 7/2014 Rellas et al.
2014/0258083 A1 9/2014 Achanta et al.
2014/0279467 A1 9/2014 Chapa et al.
2014/0280945 A1 9/2014 Lunt
2014/0283123 A1 9/2014 Lonstein et al.
2014/0289812 A1 9/2014 Wang et al.
2014/0298485 A1 10/2014 Gardner
2014/0317023 A1 10/2014 Kim
2014/0317716 A1 10/2014 Chao et al.
2014/0331282 A1 11/2014 Tkachev
2014/0365653 A1 12/2014 Matoba
2014/0379600 A1 12/2014 Chapa et al.
2015/0067341 A1 3/2015 Deen et al.
2015/0089569 A1 3/2015 Sondhi et al.
2015/0128237 A1 5/2015 Lund et al.
2015/0142595 A1 5/2015 Acuña-Rohter
2015/0150106 A1 5/2015 Lund et al.
2015/0161228 A1 6/2015 Davies
2015/0180870 A1 6/2015 Zhang et al.
2015/0199667 A1 7/2015 Fernando et al.
2015/0199668 A1 7/2015 Fernando et al.
2015/0229512 A1 8/2015 Dutti et al.
2015/0249655 A1 9/2015 Lunt
2015/0254658 A1 9/2015 Bondesen et al.
2015/0278277 A1 10/2015 Agrawal et al.
2015/0350186 A1 12/2015 Chan et al.
2016/0005020 A1 1/2016 Fernando et al.
2016/0027008 A1 1/2016 John
2016/0050198 A1 2/2016 Thibadeau, Sr. et al.
2016/0065563 A1 3/2016 Broadbent et al.
2016/0070758 A1 3/2016 Thomson et al.
2016/0087957 A1 3/2016 Shah et al.
2016/0088465 A1 3/2016 Golla
2016/0142532 A1 5/2016 Bostick
2016/0164878 A1 6/2016 Nakano
2016/0217444 A1 7/2016 Martin
2016/0217445 A1 7/2016 Martin
2016/0226879 A1 8/2016 Chan et al.
2016/0275476 A1 9/2016 Artman et al.
2016/0283740 A1 9/2016 Roundtree
2016/0294612 A1 10/2016 Ravinoothala et al.
2016/0337369 A1 11/2016 Sanso
2017/0061436 A1 3/2017 Liu et al.
2017/0111336 A1 4/2017 Davis et al.
2017/0140386 A1 5/2017 Kolkowitz et al.
2017/0163532 A1 6/2017 Tubaltsev et al.
2017/0186012 A1 6/2017 McNeal
2017/0200223 A1 7/2017 Kasower
2017/0324749 A1 11/2017 Bhargava et al.
2017/0331832 A1 11/2017 Lander et al.
2017/0337549 A1 11/2017 Wong
2017/0337557 A1 11/2017 Durney et al.
2017/0357971 A1 12/2017 Pitz et al.
2018/0041336 A1 2/2018 Keshava et al.
2018/0046856 A1 2/2018 Kapczynski
2018/0077142 A1 3/2018 Thakkar
2018/0083915 A1 3/2018 Medam et al.
2018/0097828 A1 4/2018 Coskun
2018/0145967 A1 5/2018 Matsugashita
2018/0184288 A1 6/2018 De Lorenzo et al.
2018/0227292 A1 8/2018 Golshan et al.
2018/0232433 A1 8/2018 Kanvinde
2018/0285549 A1 10/2018 Sonkar et al.
2018/0336471 A1 11/2018 Rezagholizadeh
2018/0337914 A1 11/2018 Mohamad Abdul et al.
2018/0343265 A1 11/2018 McMillan et al.
2018/0351852 A1 12/2018 Boucadair et al.
2018/0365690 A1 12/2018 Ovick et al.
2018/0375791 A1 12/2018 Kaladgi et al.
2019/0073676 A1 3/2019 Wang
2019/0095516 A1 3/2019 Srinivasan et al.
2019/0164173 A1 5/2019 Liu et al.
2019/0205905 A1 7/2019 Raghunathan
2019/0208040 A1 7/2019 Boucadair et al.
2019/0228173 A1 7/2019 Gupta et al.
2019/0228178 A1 7/2019 Sharma et al.
2019/0259030 A1 8/2019 Burger
2019/0260594 A1 8/2019 Singhal et al.
2019/0268797 A1 8/2019 Pang et al.
2019/0273809 A1 9/2019 Boucadair et al.
2019/0306157 A1 10/2019 Lores et al.
2019/0349360 A1 11/2019 Yeddula et al.
2019/0378010 A1 12/2019 Morris
2019/0394041 A1 12/2019 Jain et al.
2020/0007316 A1 1/2020 Krishnamacharya et al.
2020/0104834 A1 4/2020 Pontious et al.
2020/0118127 A1 4/2020 Miller et al.
2020/0120004 A1 4/2020 Kohout et al.
2020/0120015 A1 4/2020 Boucadair et al.
2020/0137080 A1 4/2020 Bloomquist et al.
2020/0145324 A1 5/2020 Wei et al.
2020/0160472 A1 5/2020 Kapczynski
2020/0162443 A1 5/2020 Poschel et al.
2020/0205002 A1 6/2020 Talwar
2020/0210466 A1 7/2020 Yin et al.
2020/0228321 A1 7/2020 Krishnamacharya et al.
2020/0293684 A1 9/2020 Harris et al.
2020/0304501 A1 9/2020 Fan
2020/0314088 A1 10/2020 Feijoo et al.
2020/0320511 A1 10/2020 Anderson et al.
2020/0334349 A1 10/2020 Billman et al.
2020/0342557 A1 10/2020 Chapa et al.
2020/0372535 A1 11/2020 Walz et al.
2020/0380112 A1 12/2020 Allen
2020/0380509 A1 12/2020 Billman et al.
2020/0394331 A1 12/2020 Talwar
2020/0403992 A1 12/2020 Huffman et al.
2021/0012312 A1 1/2021 Bradstreet
2021/0092115 A1 3/2021 Bhattacharyya et al.
2021/0096530 A1 4/2021 MarapaReddy
2021/0097370 A1 4/2021 Agnihotram
2021/0117969 A1 4/2021 Chilaka et al.
2021/0144131 A1 5/2021 Krishnamacharya
2021/0203667 A1 7/2021 Bondugula et al.
2021/0240808 A1 8/2021 Sadhwani et al.
2021/0241120 A1 8/2021 Chen et al.
2021/0273805 A1 9/2021 Jain et al.
2021/0282018 A1 9/2021 Talwar et al.
2021/0288948 A1 9/2021 Joffe et al.

(56) References Cited

U.S. PATENT DOCUMENTS

| | | | |
|---|---|---|---|
| 2022/0027853 | A1 | 1/2022 | McMillan et al. |
| 2022/0027891 | A1 | 1/2022 | Anderson et al. |
| 2022/0070169 | A1 | 3/2022 | Cano et al. |
| 2022/0109578 | A1 | 4/2022 | Kirsch |
| 2022/0114466 | A1 | 4/2022 | Blumenfeld |
| 2022/0173887 | A1 | 6/2022 | Krishnamacharya et al. |
| 2022/0182487 | A1 | 6/2022 | Sharma et al. |
| 2022/0239665 | A1 | 7/2022 | Bondugula et al. |
| 2022/0261461 | A1 | 8/2022 | Bondugula et al. |
| 2022/0279067 | A1 | 9/2022 | Sena, Jr. et al. |
| 2022/0335348 | A1 | 10/2022 | Miller et al. |
| 2022/0345460 | A1 | 10/2022 | Alden et al. |
| 2023/0239295 | A1 | 7/2023 | Cano et al. |
| 2023/0254404 | A1 | 8/2023 | Sharma et al. |
| 2023/0259648 | A1 | 8/2023 | Gupta et al. |
| 2023/0319036 | A1 | 10/2023 | Singh et al. |
| 2023/0376585 | A1 | 11/2023 | Allen |
| 2023/0421376 | A1 | 12/2023 | Jain et al. |
| 2024/0022431 | A1 | 1/2024 | Kirsch |
| 2024/0169314 | A1 | 5/2024 | McMillan et al. |

FOREIGN PATENT DOCUMENTS

| | | |
|---|---|---|
| AU | 2023223007 | 9/2023 |
| AU | 2023258421 | 11/2023 |
| CA | 3 076 931 | 10/2020 |
| CA | 3 052 415 | 7/2021 |
| CA | 2 896 503 | 8/2021 |
| CN | 104877993 | 9/2015 |
| EP | 1 028 401 | 8/2000 |
| EP | 1 239 378 | 9/2002 |
| EP | 1 301 887 | 4/2003 |
| EP | 1 850 278 | 10/2007 |
| EP | 2 425 583 | 3/2012 |
| EP | 2 074 513 | 2/2016 |
| EP | 2 939 364 | 6/2020 |
| EP | 3 577 850 | 7/2021 |
| EP | 3 862 897 | 8/2021 |
| EP | 4 060 941 | 9/2022 |
| ES | 2 811 070 | 3/2021 |
| GB | 2 518 099 | 3/2015 |
| IN | 201917040928 | 11/2019 |
| JP | 2005-135431 | 5/2005 |
| JP | 2005-208945 | 8/2005 |
| JP | 4202314 | 12/2008 |
| JP | 2012-113696 | 6/2012 |
| KR | 10-2000-0063313 | 11/2000 |
| KR | 10-2002-0039203 | 5/2002 |
| KR | 10-2007-0081504 | 8/2007 |
| TW | I256569 | 6/2006 |
| WO | WO 99/054803 | 10/1999 |
| WO | WO 99/060481 | 11/1999 |
| WO | WO 00/030045 | 5/2000 |
| WO | WO 01/009752 | 2/2001 |
| WO | WO 01/009792 | 2/2001 |
| WO | WO 01/010090 | 2/2001 |
| WO | WO 01/084281 | 11/2001 |
| WO | WO 02/011025 | 2/2002 |
| WO | WO 02/029636 | 4/2002 |
| WO | WO 03/073711 | 9/2003 |
| WO | WO 2004/031986 | 4/2004 |
| WO | WO 2004/049654 | 6/2004 |
| WO | WO 2005/033979 | 4/2005 |
| WO | WO 2006/019752 | 2/2006 |
| WO | WO 2006/050278 | 5/2006 |
| WO | WO 2006/069199 | 6/2006 |
| WO | WO 2006/099081 | 9/2006 |
| WO | WO 2007/001394 | 1/2007 |
| WO | WO 2007/050156 | 5/2007 |
| WO | WO 2008/042614 | 4/2008 |
| WO | WO 2008/054849 | 5/2008 |
| WO | WO 2009/064694 | 5/2009 |
| WO | WO 2009/102391 | 8/2009 |
| WO | WO 2009/108901 | 9/2009 |
| WO | WO 2009/117468 | 9/2009 |
| WO | WO 2010/001406 | 1/2010 |
| WO | WO 2010/062537 | 6/2010 |
| WO | WO 2010/077989 | 7/2010 |
| WO | WO 2010/150251 | 12/2010 |
| WO | WO 2011/005876 | 1/2011 |
| WO | WO 2011/014878 | 2/2011 |
| WO | WO 2012/054646 | 4/2012 |
| WO | WO 2013/126281 | 8/2013 |
| WO | WO 2013/140410 | 9/2013 |
| WO | WO 2014/008079 | 1/2014 |
| WO | WO 2014/150987 | 9/2014 |
| WO | WO 2015/038520 | 3/2015 |
| WO | WO 2018/129373 | 7/2018 |
| WO | WO 2018/191638 | 10/2018 |
| WO | WO 2018/199992 | 11/2018 |
| WO | WO 2019/006144 | 1/2019 |
| WO | WO 2019/152592 | 8/2019 |
| WO | WO 2019/209857 | 10/2019 |
| WO | WO 2019/245998 | 12/2019 |
| WO | WO 2020/206305 | 10/2020 |
| WO | WO 2021/011308 | 1/2021 |
| WO | WO 2021/067446 | 4/2021 |
| WO | WO 2021/097090 | 5/2021 |
| WO | WO 2021/138263 | 7/2021 |
| WO | WO 2021/155053 | 8/2021 |
| WO | WO 2023/192175 | 10/2023 |

OTHER PUBLICATIONS

U.S. Appl. No. 12/705,511, filed Feb. 12, 2010, Bargoli et al.
Aad et al., "NRC Data Collection and the Privacy by Design Principles", IEEE, Nov. 2010, pp. 5.
Actuate, "Delivering Enterprise Information for Corporate Portals", White Paper, 2004, pp. 1-7.
"Aggregate and Analyze Social Media Content: Gain Faster and Broader Insight to Market Sentiment," SAP Partner, Mantis Technology Group, Apr. 2011, pp. 4.
Aharony et al., "Social Area Networks: Data Networking of the People, by the People, for the People," 2009 International Conference on Computational Science and Engineering, May 2009, pp. 1148-1155.
Aktas et al., "Personalizing PageRank Based on Domain Profiles", WEBKDD workshop: Webmining and Web Usage Analysis, Aug. 22, 2004, pp. 83-90.
Aktas et al., "Using Hyperlink Features to Personalize Web Search", WEBKDD workshop: Webmining and Web Usage Analysis, Aug. 2004.
"Arizona Company Has Found Key in Stopping ID Theft," PR Newswire, New York, Aug. 10, 2005 http://proquest.umi.com/pqdweb?did=880104711&sid=1&Fmt=3&clientId=19649&RQT=309&Vname=PQD.
ABC News Now:Money Matters, as broadcasted Nov. 15, 2005 with guest Todd Davis (CEO of Lifelock), pp. 6.
Anonymous, "Credit-Report Disputes Await Electronic Resolution," Credit Card News, Chicago, Jan. 15, 1993, vol. 5, No. 19, p. 5.
Anonymous, "MBNA Offers Resolution of Credit Card Disputes," Hempstead, Feb. 2002, vol. 68, No. 2, p. 47.
Anonymous, "Feedback", Credit Management, ABI/INFORM Global, Sep. 2006, pp. 6.
Bacon, Chris, "OAuth id_token missing information on refresh #1141", <https://github.com/googleapis/google-api-dotnet-client/issues/1141>, Jan. 1, 2018, pp. 9.
Bielski, Lauren, "Will you Spend to Thwart ID Theft?" ABA Banking Journal, Apr. 2005, pp. 54, 56-57, 60.
BlueCava, "What We Do", http://www.bluecava.com/what-we-do/, printed Nov. 5, 2012 in 3 pages.
Buxfer, http://www.buxfer.com/ printed Feb. 5, 2014 in 1 page.
Check, http://check.me/ printed Feb. 5, 2014 in 3 pages.
Cheng, Fred, "Security Attack Safe Mobile and Cloud-based One-time Password Tokens Using Rubbing Encryption Algorithm", MONET, 2011, vol. 16, pp. 304-336.
Chores & Allowances, "Do Kids Have Credit Reports?" Oct. 15, 2007, http://choresandallowances.blogspot.com/2007/10/do-kids-have-credit-reports.html, pp. 5.

(56) References Cited

OTHER PUBLICATIONS

Comlounge.net, "plonesocial.auth.rpx" http://web.archive.org/web/20101026041841/http://comlounge.net/rpx as captured Oct. 26, 2010 in 9 pages.
"Consumers Gain Immediate and Full Access to Credit Score Used by Majority of U.S. Lenders", PR Newswire, ProQuest, Mar. 19, 2001, p. 1.
"CreditCheck Monitoring Services," Dec. 11, 2000, pp. 1, lines 21-23.
Cullen, Terri; "The Wall Street Journal Complete Identity Theft Guidebook:How to Protect Yourself from the Most Pervasive Crime in America"; Chapter 3, pp. 59-79; Jul. 10, 2007.
"D&B Corporate Family Linkage", D&B Internet Access for U.S. Contract Customers, https://www.dnb.com/ecomp/help/linkage.htm as printed Dec. 17, 2009, pp. 1.
Day, Jo and Kevin; "ID-ology: A Planner's Guide to Identity Theft"; Journal of Financial Planning:Tech Talk; pp. 36-38; Sep. 2004.
Equifax, "InstaTouch ID: Separate Fact from Friction." http://equifax.uberflip.com/i/791148-mobile-consumer-identity-service-product-sheet/1, 2016, pp. 2.
Equifax; "Equifax Credit Watch"; https://web.archive.org/web/20070627135447/https://www.econsumer.equifax.co.uk/consumer/uk/sitepage.ehtml?forward=gb_esn_detail, dated Jun. 27, 2007 on www.archive.org in 2 pages.
Ettorre, "Paul Kahn on Exceptional Marketing," Management Review, vol. 83, No. 11, Nov. 1994, pp. 48-51.
Facebook, "Facebook helps you connect and share with the people in your life," www.facebook.com printed Nov. 16, 2010 in 1 page.
FamilySecure.com, "Frequently Asked Questions", http://www.familysecure.com/FAQ.aspx as archived Jul. 15, 2007 in 3 pages.
FamilySecure.com; "Identity Theft Protection for the Whole Family | FamilySecure.com" http://www.familysecure.com/, as retrieved on Nov. 5, 2009.
Fenner, Peter, "Mobile Address Management and Billing for Personal Communications", 1st International Conference on Universal Personal Communications, 1992, ICUPC '92 Proceedings, pp. 253-257.
"Fictitious Business Name Records", Westlaw Database Directory, http://directory.westlaw.com/scope/default.asp?db=FBN-ALL&RS-W . . . &VR=2.0 as printed Dec. 17, 2009, pp. 5.
Fisher, Joseph, "Access to Fair Credit Reports: Current Practices and Proposed Legislation," American Business Law Journal, Fall 1981, vol. 19, No. 3, p. 319.
Franks et al., "HTTP Authentication: Basic and Digest Access Authentication", Network Working Group, Standards Track, Jun. 1999, pp. 34.
"Fraud Alert | Learn How". Fight Identity Theft. http://www.fightidentitytheft.com/flag.html, accessed on Nov. 5, 2009.
Gibbs, Adrienne; "Protecting Your Children from Identity Theft," Nov. 25, 2008, http://www.creditcards.com/credit-card-news/identity-ID-theft-and-kids-children-1282.php, pp. 4.
Gordon et al., "Identity Fraud: A Critical National and Global Threat," LexisNexis, Oct. 28, 2003, pp. 1-48.
Gordon et al., "Using Identity Authentication and Eligibility Assessment to Mitigate the Risk of Improper Payments", LexisNexis, Jan. 28, 2008, pp. 18. https://risk.lexisnexis.com/-/media/files/government/white-paper/identity_authentication-pdf.pdf.
Haglund, Christoffer, "Two-Factor Authentication with a Mobile Phone", Fox Technologies, Uppsala, Department of Information Technology, Nov. 2, 2007, pp. 62.
Harrington et al., "iOS 4 In Action", Chapter 17, Local and Push Notification Services, Manning Publications Co., Jun. 2011, pp. 347-353.
Herzberg, Amir, "Payments and Banking with Mobile Personal Devices," Communications of the ACM, May 2003, vol. 46, No. 5, pp. 53-58.
Hoofnagle, Chris Jay, "Identity Theft: Making the Known Unknowns Known," Harvard Journal of Law & Technology, Fall 2007, vol. 21, No. 1, pp. 98-122.
ID Analytics, "ID Analytics® Consumer Notification Service" printed Apr. 16, 2013 in 2 pages.
ID Theft Assist, "Do You Know Where Your Child's Credit Is?", Nov. 26, 2007, http://www.idtheftassist.com/pages/story14, pp. 3.
"ID Thieves These Days Want Your Number, Not Your Name", The Columbus Dispatch, Columbus, Ohio, http://www.dispatch.com/content/stories/business/2014/08/03/id-thieves-these-days-want-your-number-not-your-name.html, Aug. 3, 2014 in 2 pages.
Identity Theft Resource Center; Fact Sheet 120 A—To Order a Credit Report for a Child; Fact Sheets, Victim Resources; Apr. 30, 2007.
"Identity Thieves Beware: Lifelock Introduces Nation's First Guaranteed Proactive Solution to Identity Theft Protection," PR Newswire, New York, Jun. 13, 2005 http://proquest.umi.com/pqdweb?did=852869731&sid=1&Fmt=3&clientId=19649&RQT=309&Vname=PQD.
Ideon, Credit-Card Registry that Bellyflopped this Year, Is Drawing some Bottom-Fishers, The Wall Street Journal, Aug. 21, 1995, pp. C2.
Information Brokers of America, "Information Brokers of America Child Identity Theft Protection" http://web.archive.org/web/20080706135451/http://iboainfo.com/child-order.html as archived Jul. 6, 2008 in 1 page.
Information Brokers of America, "Safeguard Your Child's Credit", http://web.archive.org/web/20071215210406/http://www.iboainfo.com/child-id-protect.html as archived Dec. 15, 2007 in 1 page.
Intelius, "People Search—Updated Daily, Accurate and Fast!" http://www.intelius.com/people-search.html?= &gclid=CJqZIZP7paUCFYK5KgodbCUJJQ printed Nov. 16, 2010 in 1 page.
Iovation, Device Identification & Device Fingerprinting, http://www.iovation.com/risk-management/device-identification printed Nov. 5, 2012 in 6 pages.
Jones et al., "JSON Web Signature (JWS)", Internet Engineering Task Force (IETF), ISSN: 2070-1721, Standards Track, May 2015, pp. 59.
Khan, Muhammad Khurram, PhD., "An Efficient and Secure Remote Mutual Authentication Scheme with Smart Cards" IEEE International Symposium on Biometrics & Security Technologies (ISBAST), Apr. 23-24, 2008, pp. 1-6.
Lanubile, et al., "Evaluating Empirical Models for the Detection of High-Risk Components: Some Lessons Learned", 20th Annual Software Engineering Workshop, Nov. 29-30, 1995, Greenbelt, Maryland, pp. 1-6.
Lee, W.A.; "Experian, on Deal Hunt, Nets Identity Theft Insurer", American Banker: The Financial Services Daily, Jun. 4, 2003, New York, NY, 1 page.
Lefebvre et al., "A Robust Soft Hash Algorithm for Digital Image Signature", International Conference on Image Processing 2:11 (ICIP), vol. 3, Oct. 2003, pp. 495-498.
Leskovec, Jure, "Social Media Analytics: Tracking, Modeling and Predicting the Flow of Information through Networks", WWW 2011—Tutorial, Mar. 28-Apr. 1, 2011, Hyderabad, India, pp. 277-278.
Letter to Donald A. Robert from Carolyn B. Maloney, dated Oct. 31, 2007, pp. 2.
Letter to Donald A. Robert from Senator Charles E. Schumer, dated Oct. 11, 2007, pp. 2.
Letter to Harry C. Gambill from Carolyn B. Maloney, dated Oct. 31, 2007, pp. 2.
Letter to Harry C. Gambill from Senator Charles E. Schumer, dated Oct. 11, 2007, pp. 2.
Letter to Richard F. Smith from Carolyn B. Maloney, dated Oct. 31, 2007, pp. 2.
Letter to Richard F. Smith from Senator Charles E. Schumer, dated Oct. 11, 2007, pp. 2.
Li et al., "Automatic Verbal Information Verification for User Authentication", IEEE Transactions on Speech and Audio Processing, vol. 8, No. 5, Sep. 2000, pp. 585-596.
LifeLock, "How LifeLock Works," http://www.lifelock.com/lifelock-for-people printed Mar. 14, 2008 in 1 page.

(56) References Cited

OTHER PUBLICATIONS

LifeLock, "LifeLock Launches First ID Theft Prevention Program for the Protection of Children," Press Release, Oct. 14, 2005, http://www.lifelock.com/about-us/press-room/2005-press-releases/lifelock-protection-for-children.
LifeLock; "How Can LifeLock Protect My Kids and Family?" http://www.lifelock.com/lifelock-for-people/how-we-do-it/how-can-lifelock-protect-my-kids-and-family printed Mar. 14, 2008 in 1 page.
LifeLock, "Personal Identity Theft Protection & Identity Theft Products," http://www.lifelock.com/lifelock-for-people, accessed Nov. 5, 2007.
LifeLock, Various Pages, www.lifelock.com/, Jan. 9, 2007, pp. 49.
Lobo, Jude, "MySAP.com Enterprise Portal Cookbook," SAP Technical Delivery, Feb. 2002, vol. 1, pp. 1-13.
Lodderstedt et al., "OAuth 2.0 token Revocation", Internet Engineering Task Force (IETF), Standards Track, Aug. 2013, pp. 11.
Magid, Lawrence, J., Business Tools: When Selecting an ASP Ensure Data Mobility, Los Angeles Times, Los Angeles, CA, Feb. 26, 2001, vol. C, Issue 4, pp. 3.
Manilla, http://www.manilla.com/how-it-works/ printed Feb. 5, 2014 in 1 page.
Meyers et al., "Using Your Social Networking Accounts To Log Into NPR.org," NPR.org, Jun. 24, 2010, http://web.archive.org/web/20100627034054/http://www.npr.org/blogs/inside/2010/06/24/128079309/using-your-social-networking-accounts-to-log-into-npr-org in 3 pages.
Micarelli et al., "Personalized Search on the World Wide Web," The Adaptive Web, LNCS 4321, 2007, pp. 195-230.
Microsoft, "Expand the Reach of Your Business," Microsoft Business Solutions, 2004, in 16 pages.
Mint.com, http://www.mint.com/how-it-works/ printed Feb. 5, 2013 in 2 pages.
Mvelopes, http://www.mvelopes.com/ printed Feb. 5, 2014 in 2 pages.
My Call Credit http://www.mycallcredit.com/products.asp?product=ALR dated Dec. 10, 2005 on www.archive.org.
My Call Credit http://www.mycallcredit.com/rewrite.asp?display=faq dated Dec. 10, 2005 on www.archive.org.
My ID Alerts, "Why ID Alerts" http://www.myidalerts.com/why-id-alerts.jsps printed Apr. 3, 2012 in 2 pages.
My ID Alerts, "How it Works" http://www.myidalerts.com/how-it-works.jsps printed Apr. 3, 2012 in 3 pages.
"Name Availability Records", Westlaw Database Directory, http://directory.westlaw.com/scope/default.asp?db=NA-ALL&RS=W . . . &VR=2.0 as printed Dec. 17, 2009, pp. 5.
National Alert Registry Launches RegisteredOffendersList.org to Provide Information on Registered Sex Offenders, May 16, 2005, pp. 2, http://www.prweb.com/printer/240437.htm accessed on Oct. 18, 2011.
National Alert Registry Offers Free Child Safety "Safe From Harm DVD and Child Identification Kit", Oct. 24, 2006. pp. 2, http://www.prleap.com/pr/53170 accessed on Oct. 18, 2011.
National Alert Registry website titled, "Does a sexual offender live in your neighborhood", Oct. 22, 2006, pp. 2, http://web.archive.org/wb/20061022204835/http://www.nationallertregistry.com/ accessed on Oct. 13, 2011.
Next Card: About Us, http://web.cba.neu.edu/~awatson/NextCardCase/NextCardAboutUs.htm printed Oct. 23, 2009 in 10 pages.
Ogg, Erica, "Apple Cracks Down on UDID Use", http://gigaom.com/apple/apple-cracks-down-on-udid-use/ printed Nov. 5, 2012 in 5 Pages.
Pagano, et al., "Information Sharing in Credit Markets," Dec. 1993, The Journal of Finance, vol. 48, No. 5, pp. 1693-1718.
Partnoy, Frank, Rethinking Regulation of Credit Rating Agencies: An Institutional Investor Perspective, Council of Institutional Investors, Apr. 2009, pp. 21.
Paustian, Chuck, "Every Cardholder a King Customers get the Full Treatment at Issuers' Web Sites," Card Marketing, New York, Mar. 2001, vol. 5, No. 3, pp. 4.
People Finders, http://www.peoplefinders.com/?CMP=Google&utm_source=google&utm_medium=cpc printed Nov. 16, 2010 in 1 page.
People Lookup, "Your Source for Locating Anyone!" www.peoplelookup.com/people-search.html printed Nov. 16, 2010 in 1 page.
People Search, "The Leading Premium People Search Site on the Web," http://www.peoplesearch.com printed Nov. 16, 2010 in 2 pages.
PersonalCapital.com, http://www.personalcapital.com/how-it-works printed Feb. 5, 2014 in 5 pages.
Phinisee, Tamarind, "Banks, FTC Step Up Efforts to Address Identity Theft", San Antonio Business Journal; San Antonio, Jul. 5, 2002, vol. 16, No. 24, pp. 5.
Press Release—"Helping Families Protect Against Identity Theft—Experian Announces FamilySecure.com; Parents and guardians are alerted for signs of potential identity theft for them and their children; product features an industry-leading $2 million guarantee"; PR Newswire; Irvine, CA; Oct. 1, 2007.
Privacy Rights Clearinghouse, "Identity Theft: What to do if it Happens to You," http://web.archive.org/web/19990218180542/http://privacyrights.org/fs/fs17a.htm printed Feb. 18, 1999.
Ramaswamy, Vinita M., Identity-Theft Toolkit, The CPA Journal, Oct. 1, 2006, vol. 76, Issue 10, pp. 66-70.
Rawe, Julie; "Identity Thieves", Time Bonus Section, Inside Business, Feb. 2002, pp. 2.
Roth, Andrew, "CheckFree to Introduce E-Mail Billing Serving," American Banker, New York, Mar. 13, 2001, vol. 166, No. 49, pp. 3.
Sakimura et al., "OpenID Connect Core 1.0 Incorporating Errata Set 1", <https://openid.net/specs/openid-connect-core-1_0.html>, Nov. 8, 2014, pp. 78.
SAS, "SAS® Information Delivery Portal", Fact Sheet, 2008, in 4 pages.
Scholastic Inc.:Parent's Request for Information http://web.archive.org/web/20070210091055/http://www.scholastic.com/inforequest/index.htm as archived Feb. 10, 2007 in 1 page.
Scholastic Inc.:Privacy Policy http://web.archive.org/web/20070127214753/http://www.scholastic.com/privacy.htm as archived Jan. 27, 2007 in 3 pages.
Securities and Futures Commission, "Guideline on Anti-Money Laundering and Counter-Terrorist Financing", Jul. 2012, pp. 135.
Singletary, Michelle, "The Littlest Victims of ID Theft", The Washington Post, The Color of Money, Oct. 4, 2007.
Sun, Hung-Min, "An Efficient Remote Use Authentication Scheme Using Smart Cards", IEEE Transactions on Consumer Electronics, Nov. 2000, vol. 46, No. 4, pp. 958-961.
Target, "Free Credit Monitoring and Identity Theft Protection with Experian's ProtectMyID Now Available", Jan. 13, 2014, pp. 2. http://corporate.target.com.
TheMorningCall.com, "Cheap Ways to Foil Identity Theft," www.mcall.com/business/columnists/all-karp.5920748jul01,0 . . . , published Jul. 1, 2007.
"TransUnion—Child Identity Theft Inquiry", TransUnion, http://www.transunion.com/corporate/personal/fraudIdentityTheft/fraudPrevention/childIDInquiry.page as printed Nov. 5, 2009 in 4 pages.
Truston, "Checking if your Child is an ID Theft Victim can be Stressful," as posted by Michelle Pastor on Jan. 22, 2007 at http://www.mytruston.com/blog/credit/checking_if_your_child_is_an_id_theft_vi.html.
US Legal, Description, http://www.uslegalforms.com/US/US-00708-LTR.htm printed Sep. 4, 2007 in 2 pages.
Vamosi, Robert, "How to Handle ID Fraud's Youngest Victims," Nov. 21, 2008, http://news.cnet.com/8301-10789_3-10105303-57.html.
Waggoner, Darren J., "Having a Global Identity Crisis," Collections & Credit Risk, Aug. 2001, vol. vol. 6, No. 8, pp. 6.
Wang et al., "User Identification Based on Finger-vein Patterns for Consumer Electronics Devices", IEEE Transactions on Consumer Electronics, May 2010, vol. 56, No. 2, pp. 799-804.

(56) References Cited

OTHER PUBLICATIONS

Weaver et al., "Federated, Secure Trust Networks for Distributed Healthcare IT Services", IEEE International Conference on Industrial Informatics, 2003. INDIN 2003. Proceedings, 2003, pp. 162-169.
WhatIs.com, "Risk-Based Authentication (RBA)", https://web.archive.org/web/20121025033106/http://whatis.techtarget.com/definition/risk-based-authentication-RBA, Oct. 23, 2012, pp. 1.
Willems et al., "On the Security and Privacy of Interac e-Transfers", School of Electrical Engineering and Computer Science, Faculty of Engineering, University of Ottawa, Extended Version, Dec. 10, 2019, pp. 47.
Yahoo! Search, "People Search," http://people.yahoo/com printed Nov. 16, 2010 in 1 page.
YODLEE | Money Center, https://yodleemoneycenter.com/ printed Feb. 5, 2014 in 2 pages.
You Need A Budget, http://www.youneedabudget.com/features printed Feb. 5, 2014 in 3 pages.
Official Communication in Australian Patent Application No. 2014318966, dated Apr. 6, 2019.
Official Communication in Australian Patent Application No. 2019261724, dated Sep. 1, 2020.
Official Communication in Australian Patent Application No. 2021204354, dated Jun. 29, 2022.
Official Communication in Canadian Patent Application No. 2,923,697, dated Oct. 9, 2019.
Extended European Search Report for Application No. EP14843372.5, dated May 2, 2017.
Official Communication in European Application No. EP14843372.5 dated Nov. 29, 2018.
Extended European Search Report for Application No. EP19203040.1, dated Jan. 29, 2020.
Extended European Search Report for Application No. EP21183630.9, dated Oct. 15, 2021.
International Search Report and Written Opinion for Application No. PCT/US2014/054713, dated Dec. 15, 2014.
International Preliminary Report on Patentability in Application No. PCT/US2014/054713, dated Mar. 24, 2016.
Official Communication in Australian Patent Application No. 2006306790, dated Apr. 29, 2010.
Official Communication in Australian Patent Application No. 2006306790, dated May 19, 2011.
International Search Report and Written Opinion for Application No. PCT/US2006/028006, dated Jul. 27, 2007.
International Preliminary Report on Patentability in Application No. PCT/US2006/028006, dated Apr. 23, 2008.
International Search Report and Written Opinion for Application No. PCT/US2019/037547, dated Oct. 4, 2019.
International Preliminary Report on Patentability in Application No. PCT/US2019/037547, dated Dec. 30, 2020.
International Search Report and Written Opinion for Application No. PCT/US2021/015566, dated May 11, 2021.
International Preliminary Report on Patentability in Application No. PCT/US2021/015566, dated Aug. 11, 2022.
Dekleva, Sasha, "Electronic Commerce: A Half-Empty Glass?" Communications of the Association for Information Systems, Jun. 2000, vol. 3, Article 18, pp. 101.
Official Communication in Australian Patent Application No. 2023226759, dated Sep. 21, 2023.

* cited by examiner

SYSTEMS AND METHODS OF DELAYED AUTHENTICATION AND BILLING FOR ON-DEMAND PRODUCTS

CROSS-REFERENCE TO RELATED APPLICATIONS

This patent application is a continuation of U.S. patent application Ser. No. 17/449,151, filed Sep. 28, 2021, which is a continuation of U.S. patent application Ser. No. 16/848,260, filed Apr. 14, 2020, which application issued as U.S. Pat. No. 11,164,271, which is a continuation of U.S. patent application Ser. No. 14/481,714, filed Sep. 9, 2014, which application issued as U.S. Pat. No. 10,664,936, which claims priority from U.S. Provisional Patent Application No. 61/876,086, filed Sep. 10, 2013. In addition, U.S. patent application Ser. No. 14/481,714 is a continuation-in-part of U.S. patent application Ser. No. 14/272,942, filed May 8, 2014 (now abandoned). U.S. patent application Ser. No. 14/272,942 is a continuation of U.S. patent application Ser. No. 13/870,489, filed Apr. 25, 2013, which application issued as U.S. Pat. No. 8,751,388. U.S. patent application Ser. No. 13/870,489 claims priority from U.S. Provisional Patent Application No. 61/786,585, filed Mar. 15, 2013. U.S. patent application Ser. No. 16,848,260, U.S. patent application Ser. No. 14/481,714, U.S. patent application Ser. No. 14/272,942, U.S. patent application Ser. No. 13/870,489, U.S. Provisional Patent Application No. 61/786,585, and U.S. Provisional Patent Application No. 61/876,086 are all hereby incorporated by reference in their entirety.

BACKGROUND OF THE INVENTION

Technical Field

The present disclosure relates generally to computer processing and more particularly, but not by way of limitation, to authentication systems and methods for on-demand products.

History of Related Art

Numerous computer systems exist that provide on-demand products to consumers. For purposes of this patent application, an on-demand product is a product that is requested by a requestor such as a consumer and is intended by a provider to be delivered in real-time or in near real-time. On-demand products are generally requested electronically over a communications network such as, for example, public or private intranets, a public switched telephone network (PSTN), a cellular network, the Internet, or the like. Examples of on-demand products include content such as, for example, text, graphics, photos, video, audio, code, software applications, documents, access to cloud applications, and the like. On-demand products can also include content streaming, for example, of video, audio, and the like. By way of further example, on-demand products may include services such as, for example, identity-monitoring services. In general, on-demand products are not, inter alia, physically shipped or delivered. Rather, on-demand products are typically delivered electronically over a communications network or by initiating a requested service. Oftentimes, however, it can be difficult to provide on-demand products efficiently and securely.

In addition, traditionally, systems that provide on-demand products bill for the on-demand product soon after a consumer has made a binding request for the on-demand product, for example, by requesting or enrolling for the on-demand product and providing payment information. When various complexities cause the on-demand product to not be delivered, a consumer is usually still charged for the on-demand product. As consumer-protection laws and regulations proliferate worldwide, such billing practices can carry significant risk.

SUMMARY OF THE INVENTION

In one embodiment, a method is performed by a computer system. The method includes receiving, from a requestor, a request for an on-demand identity product in relation to an identity of a consumer, the request comprising personally identifying information (PII) of the consumer. The method also includes executing, using the PII, a partial registration of the consumer for the on-demand identity product, the partial registration omitting satisfaction of at least one security requirement. The at least one security requirement includes a requirement that the requestor be authenticated as having an asserted identity. The method additionally includes determining whether delayed authentication is enabled for the on-demand identity product. Moreover, the method includes, responsive to a determination that delayed authentication is enabled for the on-demand identity product: conditionally suspending the at least one security requirement; initiating provision of the on-demand identity product to the requestor, the provision comprising processing data related to the identity of the consumer; and restricting the requestor's access to determined sensitive data resulting from the initiated provision at least until the at least one security requirement is satisfied.

In one embodiment, an identity-product provision system includes at least one processing unit. The at least one processing unit is operable to perform a method. The method includes receiving, from a requestor, a request for an on-demand identity product in relation to an identity of a consumer, the request comprising personally identifying information (PII) of the consumer. The method also includes executing, using the PII, a partial registration of the consumer for the on-demand identity product, the partial registration omitting satisfaction of at least one security requirement. The at least one security requirement includes a requirement that the requestor be authenticated as having an asserted identity. The method additionally includes determining whether delayed authentication is enabled for the on-demand identity product. Moreover, the method includes, responsive to a determination that delayed authentication is enabled for the on-demand identity product: conditionally suspending the at least one security requirement; initiating provision of the on-demand identity product to the requestor, the provision comprising processing data related to the identity of the consumer; and restricting the requestor's access to determined sensitive data resulting from the initiated provision at least until the at least one security requirement is satisfied.

In one embodiment, a computer-program product includes a non-transitory computer-usable medium having computer-readable program code embodied therein. The computer-readable program code adapted to be executed to implement a method. The method includes receiving, from a requestor, a request for an on-demand identity product in relation to an identity of a consumer, the request comprising personally identifying information (PII) of the consumer. The method also includes executing, using the PII, a partial registration of the consumer for the on-demand identity product, the partial registration omitting satisfaction of at least one security requirement. The at least one security requirement includes a requirement that the requestor be authenticated as having an asserted identity. The method additionally includes determining whether delayed authentication is enabled for the on-demand identity product.

Moreover, the method includes, responsive to a determination that delayed authentication is enabled for the on-demand identity product: conditionally suspending the at least one security requirement; initiating provision of the on-demand identity product to the requestor, the provision comprising processing data related to the identity of the consumer; and restricting the requestor's access to determined sensitive data resulting from the initiated provision at least until the at least one security requirement is satisfied.

BRIEF DESCRIPTION OF THE DRAWINGS

A more complete understanding of the method and apparatus of the present disclosure may be obtained by reference to the following Detailed Description when taken in conjunction with the accompanying Drawings wherein.

DETAILED DESCRIPTION OF THE PREFERRED EMBODIMENT

Figure 1:
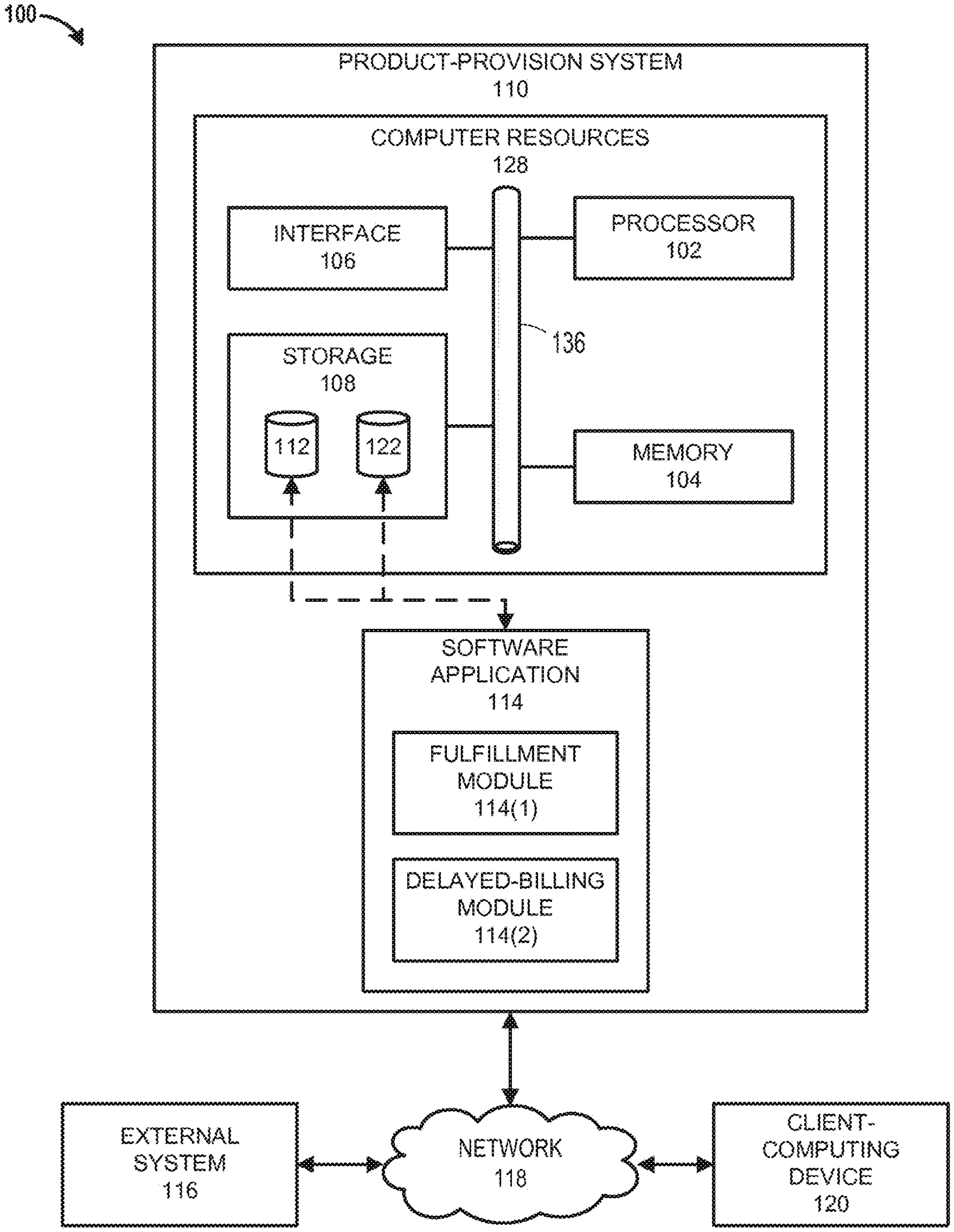
FIG. 1 illustrates an example of a system that can be used for on-demand product provision.

In various embodiments, on-demand products can be provided by a computer system over a network. In certain embodiments, an on-demand product may receive, generate, or otherwise process sensitive data. For purposes of this patent application, sensitive data can include any data not intended for public dissemination such as, for example, data considered classified, confidential, personal, and/or the like. A primary purpose of some on-demand products may be to make sensitive data accessible to requestors of the on-demand products.

For purposes of this patent application, providing or delivering an on-demand product refers to automated actions by a computer system to fulfill a request for the on-demand product. For example, for various types of on-demand products, providing or delivering the on-demand products can include transmitting, streaming, or initializing the on-demand product. For various types of on-demand products, providing or delivering the on-demand products can also include, for example, making the on-demand products accessible to consumers for transmission or streaming thereto.

One example of an on-demand product is an on-demand identity product. An on-demand identity product, as used herein, is an on-demand product as defined above that may be used to facilitate discovery or prevention of identity theft. Identity theft generally involves a use of personally identifying information (PII) that is not authorized by an owner of the PII and can include, for example, an unauthorized change to PII or an unauthorized use of PII to access resources or to obtain credit or other benefits. PII, as used herein, refers to information that can be used to uniquely identify, contact, or locate an individual person or can be used with other sources to uniquely identify, contact, or locate an individual person. PII may include, but is not limited to, social security numbers (SSNs), bank or credit card account numbers, passwords, birth dates, and addresses.

Identity products can include, for example, credit products. For purposes of this patent application, a credit product is an on-demand identity product as defined above that pertains to receiving, acquiring, reporting on, monitoring, or otherwise acting upon information related to consumer credit files. On-demand identity products that are not credit products may be referenced herein as non-credit products. Non-credit products can include monitoring and/or reporting services relating, for example, to exchanges of PII over the Internet, aliases associated with social-security numbers, sex-offender registries, payday loans, changes of address, and the like. After reviewing the present disclosure, one skilled in the art will appreciate that, in many cases, on-demand identity products may receive, generate, or otherwise process sensitive data as a fundamental part of their operation. In addition, a primary purpose of such on-demand identity products is often to provide reports, alerts, and/or other information relating to a consumer's identity. This information can include, or itself be, sensitive data.

One way to ensure the security of sensitive data is to require authentication as a prerequisite to providing an on-demand product. In so doing, it may be ensured that sensitive data is not presented or made accessible to unauthorized parties. For example, a requestor may provide PII sufficient to register a consumer for identity or credit monitoring. In general, the requestor asserts an identity that is authorized to register the consumer such as, for example, the consumer's identity, an identity of a parent or legal guardian of the consumer, and/or the like. In an example, if the requestor asserts to be the consumer, authentication may involve authenticating that the requestor is the consumer (i.e., that the requestor owns the provided PII). Examples of authentication that may be performed are described in U.S. Pat. No. 7,340,042 and U.S. patent application Ser. No. 13/093,664. U.S. Pat. No. 7,340,042 and U.S. patent application Ser. No. 13/093,664 are hereby incorporated by reference.

In many cases, performing authentication as a prerequisite to providing an on-demand product as described above can have certain disadvantages. For example, this approach can be a performance bottleneck. Authentication can be a time-consuming and computationally-expensive process and, in general, the time spent authenticating results in time not spent providing the on-demand product. In addition, authentication can often fail due to technical issues, incomplete or inaccurate information from the requestor, or other non-fraudulent reasons. Overall, authentication can be a significant consumer of time and resources. This can cause a diminished end-user experience for the requestor. In some cases, the diminished end-user experience may be measured, for example, by end-to-end response time, abandoned registrations, and/or other performance metrics. The approach described above can also result in computer-resource waste due, for example, to the resource cost of abandoned registrations, resuming incomplete registrations, etc.

The present disclosure describes examples of computationally efficient authentication. In various embodiments, a computer system can include a configuration option for an on-demand product that allows requestor authentication to be delayed without delaying provision of the on-demand product. For example, in some embodiments, provision of the on-demand product can be initiated substantially immediately after other registration information is obtained. In certain embodiments, if delayed authentication is enabled via the configuration option, a requirement that the requestor be authenticated can be conditionally suspended. Stated somewhat differently, the computer system can allow restricted access to the on-demand product conditioned upon, for example, whether data to be presented or made accessible is deemed sensitive. Satisfaction of the requirement can be delayed, for example, until such a time that data deemed sensitive is to be presented or made accessible to the requestor.

In addition, the present disclosure describes examples of more efficiently billing for on-demand products. In a typical embodiment, a product-provision system is operable to configurably delay when consumers are billed for on-demand products in accordance with delayed-billing settings. As used herein, delayed-billing settings refer to one or more sets of criteria for determining whether a consumer can be billed for an on-demand product at a given point in time. For purposes of this patent application, billing refers to initiating payment extraction via provided payment information. Billing can include, for example, charging a credit line (e.g., a credit card), initiating a bank draft, applying a credit, debiting an account, or the like. Billing can also include, for example, authorizing a third-party to charge a credit line, initiate a bank draft, apply a credit, debit an account, or the like.

FIG. 1 illustrates an example of a system 100 that can be used for on-demand product provision. The system 100 includes a product-provision system 110, one or more external systems 116, and one or more client-computing devices 120. The product provision system 110 is operable to communicate with the one or more external systems 116 and the one or more client-computing devices 120 over a network 118.

The product-provision system 110 includes a software application 114 operable to execute on computer resources 128. In particular embodiments, the product provision system 110 may perform one or more steps or blocks of one or more methods described or illustrated herein. In particular embodiments, one or more computer systems may provide functionality described or illustrated herein. In particular embodiments, encoded software running on one or more computer systems may perform one or more steps or blocks of one or more methods described or illustrated herein or provide functionality described or illustrated herein.

The components of the product-provision system 110 may comprise any suitable physical form, configuration, number, type and/or layout. As an example, and not by way of limitation, the product-provision system 110 may comprise an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a wearable or body-borne computer, a server, or a combination of two or more of these. Where appropriate, the product-provision system 110 may include one or more computer systems; be unitary or distributed; span multiple locations; span multiple machines; or reside in a cloud, which may include one or more cloud components in one or more networks.

In the depicted embodiment, the product-provision system 110 includes a processor 102, memory 104, storage 108, interface 106, and bus 136. Although a particular product-provision system is depicted having a particular number of particular components in a particular arrangement, this disclosure contemplates any suitable product-provision system having any suitable number of any suitable components in any suitable arrangement.

Processor 102 may be a microprocessor, controller, or any other suitable computing device, resource, or combination of hardware, software and/or encoded logic operable to execute, either alone or in conjunction with other components, (e.g., memory 104), the software application 114. Such functionality may include providing various features discussed herein. In particular embodiments, processor 102 may include hardware for executing instructions, such as those making up the software application 114. As an example and not by way of limitation, to execute instructions, processor 102 may retrieve (or fetch) instructions from an internal register, an internal cache, memory 104, or storage 108; decode and execute them; and then write one or more results to an internal register, an internal cache, memory 104, or storage 108.

In particular embodiments, processor 102 may include one or more internal caches for data, instructions, or addresses. This disclosure contemplates processor 102 including any suitable number of any suitable internal caches, where appropriate. As an example and not by way of limitation, processor 102 may include one or more instruction caches, one or more data caches, and one or more translation lookaside buffers (TLBs). Instructions in the instruction caches may be copies of instructions in memory 104 or storage 108 and the instruction caches may speed up retrieval of those instructions by processor 102. Data in the data caches may be copies of data in memory 104 or storage 108 for instructions executing at processor 102 to operate on; the results of previous instructions executed at processor 102 for access by subsequent instructions executing at processor 102, or for writing to memory 104, or storage 108; or other suitable data. The data caches may speed up read or write operations by processor 102. The TLBs may speed up virtual-address translations for processor 102. In particular embodiments, processor 102 may include one or more internal registers for data, instructions, or addresses. Depending on the embodiment, processor 102 may include any suitable number of any suitable internal registers, where appropriate. Where appropriate, processor 102 may include one or more arithmetic logic units (ALUs); be a multi-core processor; include one or more processors 102; or any other suitable processor.

Memory 104 may be any form of volatile or non-volatile memory including, without limitation, magnetic media, optical media, random access memory (RAM), read-only memory (ROM), flash memory, removable media, or any other suitable local or remote memory component or components. In particular embodiments, memory 104 may include random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM, or any other suitable type of RAM or memory. Memory 104 may include one or more memories 104, where appropriate. Memory 104 may store any suitable data or information utilized by the product-provision system 110, including software embedded in a computer readable medium, and/or encoded logic incorporated in hardware or otherwise stored (e.g., firmware). In particular embodiments, memory 104 may include main memory for storing instructions for processor 102 to execute or data for processor 102 to operate on. In particular embodiments, one or more memory management units (MMUs) may reside between processor 102 and memory 104 and facilitate accesses to memory 104 requested by processor 102.

As an example and not by way of limitation, the product-provision system 110 may load instructions from storage 108 or another source (such as, for example, another computer system) to memory 104. Processor 102 may then load the instructions from memory 104 to an internal register or internal cache. To execute the instructions, processor 102 may retrieve the instructions from the internal register or internal cache and decode them. During or after execution of the instructions, processor 102 may write one or more results (which may be intermediate or final results) to the internal register or internal cache. Processor 102 may then write one or more of those results to memory 104. In particular embodiments, processor 102 may execute only instructions in one or more internal registers or internal caches or in memory 104 (as opposed to storage 108 or elsewhere) and may operate only on data in one or more internal registers or internal caches or in memory 104 (as opposed to storage 108 or elsewhere).

In particular embodiments, storage 108 may include mass storage for data or instructions. As an example and not by way of limitation, storage 108 may include a hard disk drive (HDD), a floppy disk drive, flash memory, an optical disc, a magneto-optical disc, magnetic tape, or a Universal Serial Bus (USB) drive or a combination of two or more of these. Storage 108 may include removable or non-removable (or fixed) media, where appropriate. Storage 108 may be internal or external to the product-provision system 110, where appropriate. In particular embodiments, storage 108 may be non-volatile, solid-state memory. In particular embodiments, storage 108 may include read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. Storage 108 may take any suitable physical form and may comprise any suitable number or type of storage. Storage 108 may include one or more storage control units facilitating communication between processor 102 and storage 108, where appropriate.

In particular embodiments, interface 106 may include hardware, encoded software, or both providing one or more interfaces for communication (such as, for example, packet-based communication) among any networks, any network devices, and/or any other computer systems. As an example and not by way of limitation, communication interface 106 may include a network interface controller (NIC) or network adapter for communicating with an Ethernet or other wire-based network and/or a wireless NIC (WNIC) or wireless adapter for communicating with a wireless network.

Depending on the embodiment, interface 106 may be any type of interface suitable for any type of network for which product-provision system 110 is used. As an example and not by way of limitation, product-provision system 110 can include (or communicate with) an ad-hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, product-provision system 110 can include (or communicate with) a wireless PAN (WPAN) (such as, for example, a BLUETOOTH WPAN), a WI-FI network, a WI-MAX network, an LTE network, an LTE-A network, a cellular telephone network (such as, for example, a Global System for Mobile Communications (GSM) network), or any other suitable wireless network or a combination of two or more of these. The product provision system 110 may include any suitable interface 106 for any one or more of these networks, where appropriate.

In some embodiments, interface 106 may include one or more interfaces for one or more I/O devices. One or more of these I/O devices may enable communication between a person and the product-provision system 110. As an example and not by way of limitation, an I/O device may include a keyboard, keypad, microphone, monitor, mouse, printer, scanner, speaker, still camera, stylus, tablet, touchscreen, trackball, video camera, another suitable I/O device or a combination of two or more of these. An I/O device may include one or more sensors. Particular embodiments may include any suitable type and/or number of I/O devices and any suitable type and/or number of interfaces 106 for them. Where appropriate, interface 106 may include one or more drivers enabling processor 102 to drive one or more of these I/O devices. Interface 106 may include one or more interfaces 106, where appropriate.

Bus 136 may include any combination of hardware, software embedded in a computer readable medium, and/or encoded logic incorporated in hardware or otherwise stored (e.g., firmware) to couple components of the product-provision system 110 to each other. As an example and not by way of limitation, bus 136 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local (VLB) bus, or any other suitable bus or a combination of two or more of these. Bus 136 may include any number, type, and/or configuration of buses 136, where appropriate. In particular embodiments, one or more buses 136 (which may each include an address bus and a data bus) may couple processor 102 to memory 104. Bus 136 may include one or more memory buses.

Herein, reference to a computer-readable storage medium encompasses one or more tangible computer-readable storage media possessing structures. As an example and not by way of limitation, a computer-readable storage medium may include a semiconductor-based or other integrated circuit (IC) (such, as for example, a field-programmable gate array (FPGA) or an application-specific IC (ASIC)), a hard disk, an HDD, a hybrid hard drive (HHD), an optical disc, an optical disc drive (ODD), a magneto-optical disc, a magneto-optical drive, a floppy disk, a floppy disk drive (FDD), magnetic tape, a holographic storage medium, a solid-state drive (SSD), a RAM-drive, a SECURE DIGITAL card, a SECURE DIGITAL drive, a flash memory card, a flash memory drive, or any other suitable tangible computer-readable storage medium or a combination of two or more of these, where appropriate.

Particular embodiments may include one or more computer-readable storage media implementing any suitable storage. In particular embodiments, a computer-readable storage medium implements one or more portions of processor 102 (such as, for example, one or more internal registers or caches), one or more portions of memory 104, one or more portions of storage 108, or a combination of these, where appropriate. In particular embodiments, a computer-readable storage medium implements RAM or ROM.

In particular embodiments, a computer-readable storage medium implements volatile or persistent memory. In particular embodiments, one or more computer-readable storage media embody encoded software.

Herein, reference to encoded software may encompass one or more applications, bytecode, one or more computer programs, one or more executables, one or more instructions, logic, machine code, one or more scripts, or source code, and vice versa, where appropriate, that have been stored or encoded in a computer-readable storage medium. In particular embodiments, encoded software includes one or more application programming interfaces (APIs) stored or encoded in a computer-readable storage medium. Particular embodiments may use any suitable encoded software written or otherwise expressed in any suitable programming language or combination of programming languages stored or encoded in any suitable type or number of computer-readable storage media. In particular embodiments, encoded software may be expressed as source code or object code. In particular embodiments, encoded software is expressed in a higher-level programming language, such as, for example, C. Perl, or a suitable extension thereof. In particular embodiments, encoded software is expressed in a lower-level programming language, such as assembly language (or machine code). In particular embodiments, encoded software is expressed in JAVA. In particular embodiments, encoded software is expressed in Hyper Text Markup Language (HTML), Extensible Markup Language (XML), or other suitable markup language.

In a typical embodiment, the product-provision system 110 is operable to provide on-demand products to requestors and implement delayed billing for the on-demand products. The functionality of the product-provision system 110 can be facilitated by the software application 114. In certain embodiments, the software application 114 is operable to execute on the product-provision system 110 in the fashion described above. The software application 114 can include, for example, a fulfillment module 114(1) and a delayed-billing module 114(2).

In general, the fulfillment module 114(1) can logically encapsulate software that is operable to generate, acquire, and/or provide the on-demand products to requestors thereof. The on-demand products provisioned via the fulfillment module 114(1) may be selected from a number of categories such as, for example, text, graphics, photos, video, audio, code, software applications, documents, access to cloud applications, and the like. The on-demand products can also include content streaming, for example, of video, audio, and the like. By way of further example, on-demand products may include services such as, for example, monitoring services. Other examples of on-demand products will be apparent to one of ordinary skill in the art after reviewing the inventive principles contained herein.

In various embodiments, the fulfillment module 114(1) can additionally maintain and enforce authentication settings 122. As illustrated, the authentication settings 122 can be stored in the storage 108. The authentication settings 122 may be maintained, for example, as a database, flat file, and/or the like. The authentication settings 122 can include a configuration option that indicates, for a given on-demand product, whether delayed authentication is enabled or disabled. In certain embodiments, when delayed authentication is enabled, provision of the given on-demand product can be initiated before authentication occurs or is completed. In many cases, the provision can be initiated substantially immediately after receiving a request for the given on-demand product. In various embodiments, the authentication settings 122 may include varied settings for each on-demand product and/or each category of on-demand product. For example, the authentication settings 122 could indicate that delayed authentication is enabled for credit products and disabled for non-credit products. An example of a process that may be implemented by the fulfillment module 114(1) will be described with respect to FIG. 3.

The delayed-billing module 114(2) logically encapsulates software that maintains and enforces delayed-billing settings 112. As illustrated, the delayed-billing settings 112 can be stored in the storage 108. The delayed-billing settings 112 may be maintained, for example, in a database, flat file, and/or the like. In various embodiments, the delayed-billing settings 112 may include varied settings for particular categories of on-demand products. For example, streaming music may be subject to different settings than a credit-monitoring service. In various embodiments, the delayed-billing settings 112 may be established by consumers, administrators, a provider or vendor for particular on-demand products, or the like.

The delayed-billing settings 112 can take various forms. For example, the delayed-billing settings 112 can include requestor-authentication criteria. In various embodiments, the requestor-authentication criteria may require that all or part of a given consumer's PII be verified as correct prior to billing. Verification of PII can involve, for example, validating the PII against other records such as, for example, a credit file, public records, and the like. In various embodiments, the requestor-authentication criteria may further require that the requestor be authenticated as an owner of the PII (i.e., that the requestor is the consumer).

By way of further example, the delayed-billing settings 112 can include delivery-verification criteria. The delivery-verification criteria typically require that delivery of the on-demand products be verified before billing occurs. What constitutes delivery of an on-demand product is generally product-specific. Therefore, in a typical embodiment, a product delivery definition is established relative to each category of on-demand product for which delivery is deemed different. The product-delivery definition may include, for example, one or more product-delivery factors that can be evaluated by the delayed-billing module 114(2) as true or false.

In a typical embodiment, the delayed-billing module 114(2) represents a significant departure from how product-provision systems traditionally bill consumers for on-demand products. Because on-demand products are generally intended to be provided immediately, it is usually desirable to bill immediately. However, in various embodiments, technical and practical issues can unpredictably arise that prevent a particular on-demand product from being provided to a particular consumer. In a typical embodiment, the delayed-billing module 114(2) detects such issues via the delayed-billing settings 112 and acts to delay billing until it can be confirmed that the product-provision system 110 has complied with the delayed billing settings 112. An example of a delayed-billing process that may be implemented by the delayed-billing module 114(2) will be described with respect to FIG. 4.

Although the fulfillment module 114(1) and the delayed-billing module 114(2) are depicted as two separate software components, in various other embodiments, such software components are organized differently. For example, the fulfillment module 114(1) and the delayed-billing module 114(2) could be merged into a single software component, each be further divided into other software components, or have their collective functionality allocated differently among any number of software components. In addition, although the software application 114 is illustrated singly for illustrative purposes, it should be appreciated that any number of software applications may be utilized to achieve similar functionality.

The one or more client-computing devices 120 are computer systems used by requestors, for example, to request and/or receive the on-demand products. The one or more client-computing devices 120 can include, for example, desktop computers, laptop computers, tablet computers, smart phones, wearable or body-borne computers, and/or the like. The one or more external systems 116 are representative of computer systems from which the product-provision system 110 is operable to interact. For example, in various embodiments, the product provision system may acquire particular on-demand products from the one or more external systems 116 or obtain information or data necessary to generate particular on-demand products. For example, the one or more external systems 116 may provide the information or data via an application programming interface (API).

In operation, the product-provision system 110 interacts with the one or more client-computing devices 120 to receive requests for on-demand products. In many cases, the requests may be binding requests. A binding request, as used herein, refers to a request for an on-demand product for which a requestor has authorized fulfillment and provided payment information (optionally as part of the request). Upon receipt of a binding request for an on-demand product, the product-provision system 110 utilizes the fulfillment module 114(1) to attempt to provide the requested on-demand product in accordance with the authentication settings 122. Optionally in parallel, the product-provision system 110 initiates the delayed billing module 114(2) so that payment can be extracted in accordance with the delayed-billing settings 112.

Each instance of a system such as, for example, the product-provision system 110 and the one or more external systems 116, may be representative of any combination of computing equipment including, for example, any number of physical or virtual server computers and any number and organization of databases. In addition, it should be appreciated that, in various embodiments, the network 118 can be viewed as an abstraction of multiple distinct networks via which the product-provision system 110 is operable to communicate. For example, the network 118 can include one or multiple communications networks such as, for example, public or private intranets, a public switched telephone network (PSTN), a cellular network, the Internet, or the like.

As described above with respect to FIG. 1, principles described herein can be applied to numerous categories of on-demand products. For illustrative purposes, examples will now be described with respect to on-demand identity products.

Figure 2:
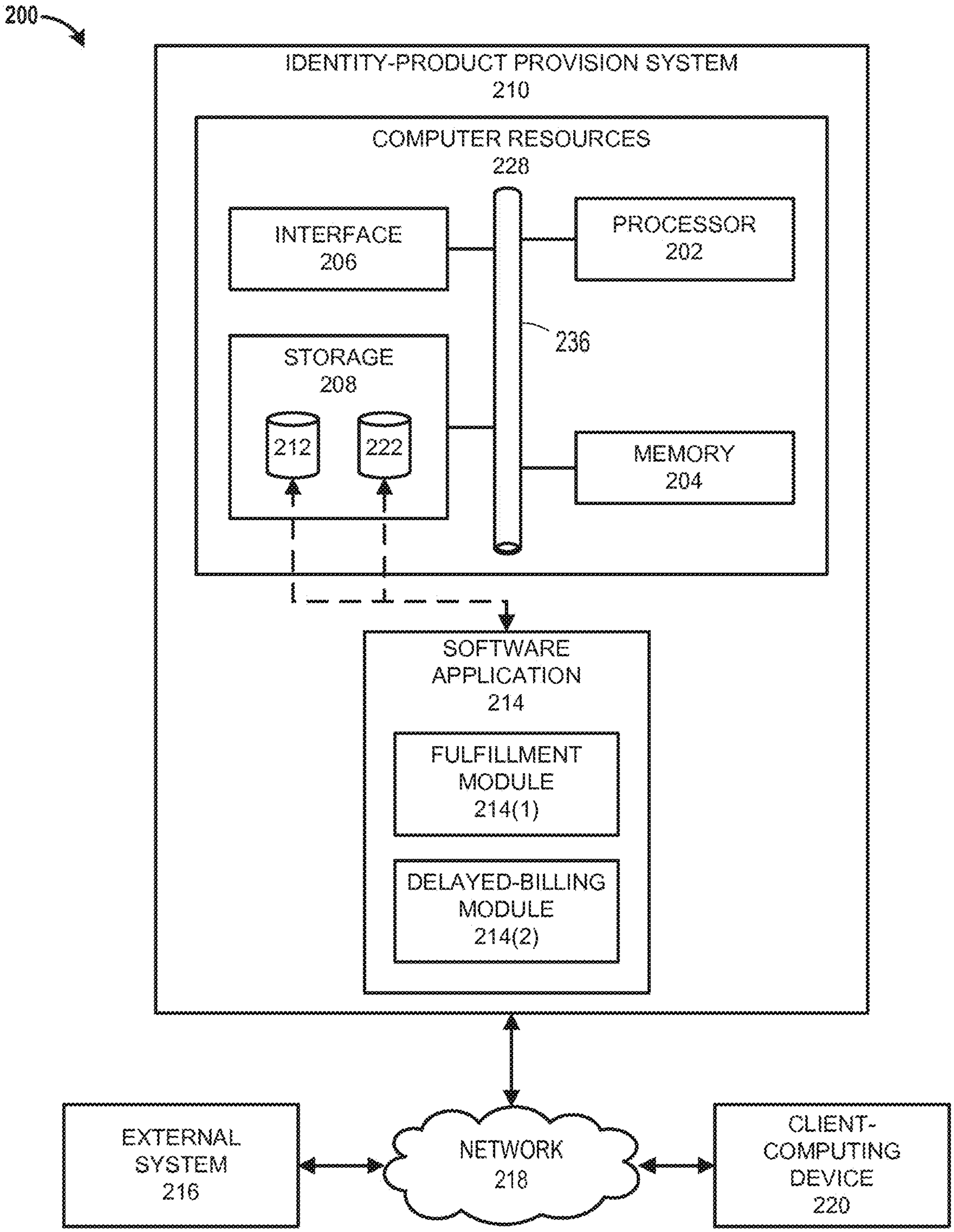
FIG. 2 illustrates an example of a system that can be used for provision and billing of on-demand identity products.

FIG. 2 illustrates an example of a system 200 that can be used for provision and billing of on-demand identity products. The system 200 includes an identity product provision system 210, one or more external systems 216, and one or more client computing devices 220. The identity-product provision system 210 includes a software application 214 executing on computer resources 228. The identity-product provision system 210 is operable to communicate with the one or more external systems 216 and the one or more client-computing devices 220 over a network 218. The software application 214 includes a fulfillment module 214(1) and a delayed-billing module 214(2).

In general, the identity-product provision system 210, the one or more external systems 216, the network 218, and the one or more client-computing devices 220 operate as described with respect to the product-provision system 110, the one or more external systems 116, the network 118, and the one or more client-computing devices 120, respectively, of FIG. 1. More specifically, however, the identity-product provision system 210 is operable to provide the on-demand identity products to requestors and implement delayed billing for the on-demand identity products.

The computer resources 228 can operate as described with respect to the computer resources 128. More particularly, processor 202, memory 204, interface 206, and storage 208 can perform functionality described with respect to the processor 102, the memory 104, the interface 106, and the storage 108, respectively, of FIG. 1. Additionally, the storage 208 can include authentication settings 222 and delayed-billing settings 212 that are similar, for example, to the authentication settings 122 and the delayed-billing settings 112, respectively, of FIG. 1.

In certain embodiments, the software application 214 can execute on the computer resources 228 in similar fashion to how the software application 114 is described above to execute on the computer resources 128. The software application 214 can include a fulfillment module 214(1) and a delayed-billing module 214(2). In particular, the fulfillment module 214(1) logically encapsulates software that is operable to generate, acquire, and/or provide the on-demand identity products to consumers. The provided on-demand identity products can include, for example, reports and monitoring services. Examples of functionality that the fulfillment module 214(1) can encapsulate is described in detail in U.S. Pat. No. 8,359,278 and in U.S. patent application Ser. No. 12/780,130, Ser. No. 13/093,664, and Ser. No. 13/398,471. U.S. Pat. No. 8,359,278 and U.S. patent application Ser. No. 12/780,130 and Ser. No. 13/398,471 are hereby incorporated by reference. U.S. patent application Ser. No. 13/093,664 has already been incorporated by reference above.

Additionally, in certain embodiments, the fulfillment module 214(1) can establish and maintain the authentication settings 222. In this fashion, the authentication settings 222 can indicate, for each on-demand identity product, whether delayed authentication is enabled or disabled. Because the on-demand identity products generally involve PII and are thus sensitive in nature, authentication typically takes on particular importance. For example, in a typical embodiment, identity products cannot be provided when a requestor has not been authenticated. In certain embodiments, as described in greater detail with respect to FIG. 3, authentication can be conditionally delayed when delayed authentication is enabled.

The delayed-billing module 214(2) logically encapsulates software that maintains and enforces the delayed-billing settings 212. For example, the delayed-billing settings 212 can include requestor-authentication criteria as described with respect to FIG. 1. Because the on-demand identity products generally involve PII and are thus sensitive in nature, the consumer-verification criteria typically takes on particular importance. For example, as described above, in a typical embodiment, identity products cannot be provided when a requestor has not been authenticated. In such cases, it is often determined that the requestor should not be billed. Therefore, the delayed-billing settings 212 can serve as a safeguard to delay billing under such circumstances.

In a typical embodiment, the delayed-billing settings 212 can also include delivery-verification criteria as described with respect to FIG. 1. In a typical embodiment, what constitutes delivery of an on-demand product may be varied between credit and non-credit products. For example, for a credit product, the delayed-billing settings 212 may require, as a delivery-verification factor, that an acknowledgement be received back from one or multiple credit bureaus (e.g., Experian, Trans Union, and Equifax in the U.S.). By way of further example, for a non-credit product, the delayed-billing settings 212 may require, as a delivery-verification factor, that the consumer has been successfully added to receive a service such as, for example, an identity-monitoring service, coordinated by the fulfillment module 214(1). In various embodiments, technical issues such as, for example, incomplete or inaccurate information from the consumer, may prevent the consumer from being successfully added to receive a service. In this fashion, the delayed-billing module 214(2) can utilize the delayed billing settings 212 to detect the technical issues and delay billing.

In operation, the identity-product provision system 210 interacts with the one or more client-computing devices 220 to receive requests for on-demand products. In some cases, the requests can be binding requests that result, for example, from enrollment as described in U.S. patent application Ser. No. 13/093,663 or from registration and/or subscription as described with respect to U.S. Pat. No. 8,359,278 (each of which is incorporated by reference above). Upon receipt of a binding request for an on-demand identity product, the identity-product provision system 210 utilizes the fulfillment module 214(1) to provide the requested on-demand identity product. Optionally in parallel, the identity-product provision system 210 initiates the delayed-billing module 214(2) so that payment can be extracted in accordance with the delayed billing settings 212.

Figure 3:
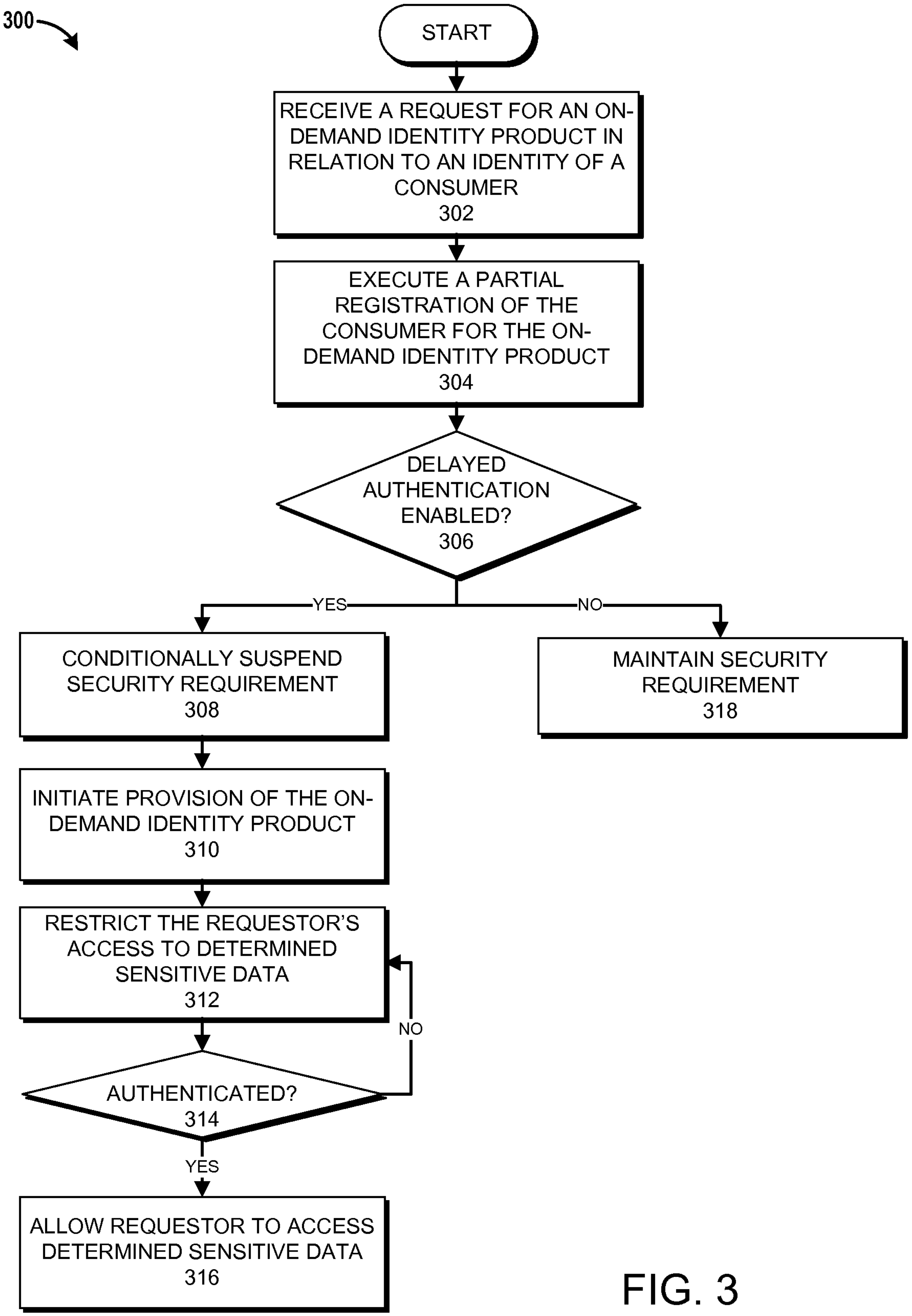
FIG. 3 illustrates an example of a process for performing delayed authentication.

FIG. 3 illustrates an example of a process 300 for performing delayed authentication. The process 300 may be performed by a fulfillment module such as, for example, the fulfillment module 114(1) of FIG. 1 or the fulfillment module 214(1) of FIG. 2. The fulfillment module is typically resident and executing on a computer system such as, for example, the product-provision system 110 of FIG. 1 or the identity-product provision system 210 of FIG. 2. The process 300 begins at block 302.

At block 302, the fulfillment module receives, from a requestor, a request for an on-demand identity product in relation to an identity of a consumer. For example, the request can be a request for a credit or non-credit product as described above. In some cases, the request can be a binding request for an on-demand identity product as described above. The request typically includes, or specifies, PII of the consumer such as, for example, a name, SSN, and/or the like.

In certain embodiments, the on-demand identity product, as part of its operation, generates, receives, or processes sensitive data related to the consumer. Consequently, the requestor typically asserts an identity for purposes of specifying who the requestor is. The asserted identity may be, for example, the identity of the consumer, an identity of a parent or legal guardian of the consumer, and/or the like. In some cases, the on-demand identity product is intended to be provided only to the consumer specified in the request. In these cases, the asserted identity may be assumed to be that of the consumer. In a typical embodiment, the on-demand identity product includes a security requirement that requires the requestor to be authenticated as having the asserted identity before the on-demand identity product can be provided.

At block 304, the fulfillment module executes a partial registration of the consumer for the on-demand identity product. The partial registration can include, for example, the fulfillment module processing and storing information from the request in storage such as the storage 108 or 208 of FIGS. 1 and 2, respectively, and/or performing other prerequisites in preparation for providing the on-demand identity product. In general, the registration may be considered partial as a result of omitting one or more prerequisites for providing the on-demand identity product to the requestor. For example, for purposes of the example of the process 300, the partial registration may be assumed to omit satisfaction of the security requirement that the requestor be authenticated.

At decision block 306, the fulfillment module determines whether delayed authentication is enabled for the on-demand identity product. For example, the block 306 may include the fulfillment module accessing authentication settings such as, for example, the authentication settings 122 of FIG. 1 or the authentication settings 222 of FIG. 2. From the authentication settings, the fulfillment module can typically determine whether delayed authentication is enabled or disabled. If it is determined at the decision block 306 that delayed authentication is not enabled (e.g., disabled), the process 300 proceeds to block 318. At block 318, the fulfillment module maintains the security requirement. In other words, at block 318, the fulfillment module typically does not initiate provision of the on-demand identity product but rather enforces the security requirement.

If it is determined at the decision block 306 that delayed authentication is enabled for the on-demand identity product, the process 300 proceeds to block 308. At block 308, the fulfillment module conditionally suspends the security requirement. In general, the block 308 involves the fulfillment module instituting a delayed-authentication workflow so as to allow provision of the on-demand identity product. In particular, the delayed-authentication workflow typically imposes conditions that limit what the requestor can access while the security requirement remains unsatisfied. For example, the fulfillment module can allow restricted access to the on-demand product conditioned upon, for example, whether data to be presented or made accessible is deemed sensitive. Satisfaction of the security requirement can be delayed, for example, until such a time that data deemed sensitive is to be presented or made accessible to the requestor.

At block 310, the fulfillment module initiates provision of the on-demand identity product to the requestor. For example, when the on-demand identity product is a monitoring service, the block 310 can include adding the identified consumer to internal systems that provide the monitoring service.

At block 312, the fulfillment module restricts the requestor's access to determined sensitive data resulting from the provision of the on-demand identity product. For example, in embodiments in which the on-demand identity product is a monitoring service, the on-demand identity product may periodically generate alerts such as, for example, identity alerts. In these embodiments, the determined sensitive data may be information underlying the identity alerts such as, for example, what detected action(s) or other item(s) resulted in the identity alerts being triggered. According to this example, the block 312 can include blocking access by the requestor to the determined sensitive data. Conversely, the requestor may be allowed access to sanitized data resulting from the provision of the on-demand identity product. Sanitized data can include, for example, information related to the existence of the identity alert. The sanitized data typically excludes the determined sensitive data. In many cases, the requestor may be prompted to authenticate upon an attempt by the requestor to access the determined sensitive data.

At decision block 314, the fulfillment module determines whether the requestor has been authenticated as required by the security requirement. If not, the process 300 returns to block 312 and proceeds as described above. In various embodiments, the process 300 can remain at blocks 312-314 for so long as the requestor remains unauthenticated. In some cases, the process 300 can be terminated after a certain period of time, after a certain number of unsuccessful authentication attempts, by an administrator, by a network element in communication with the fulfillment module, and/or when other stop criteria is met.

If it is determined at the decision block 314 that the requestor has been authenticated as required by the security requirement, the process 300 proceeds to block 316. At block 316, the fulfillment module allows the requestor to access the determined sensitive data. Stated somewhat differently, the fulfillment module allows the requestor to be provided the on-demand identity product according to the standard workflow rather than according to the delayed-authentication workflow.

Advantageously, in certain embodiments, processes such as the process 300 enable improved performance of a computer system such as the system 100 of FIG. 1 or the system 200 of FIG. 2. For example, requestors using a client-computing device such as the one or more client-computing devices 120 or 220 of FIGS. 1 and 2, respectively, can realize an improved end-user experience as a result of faster provision of on-demand products. In some cases, the improved end-user experience can be manifested in faster transaction completion, faster end-to-end response times, less time elapsed between the receipt of a request for a particular on-demand product and an initiated provision of the particular on-demand product, and/or the like. In addition, computer resources of the computer system (e.g., the computer resources 128 or 228 of FIGS. 1 and 2, respectively) can be more efficiently utilized, for example, via fewer abandoned registrations for on-demand identity products, fewer resumed or restarted registrations, etc. Moreover, in certain embodiments, the above-listed advantages and other advantages can be realized without sacrificing data security.

Although the process 300 is described with respect to on-demand identity products for illustrative purposes, it should be appreciated that similar processes can be applied to other types of on-demand products. For example, performance improvements and other advantages described above can be realized for on-demand products relating to text, graphics, photos, video, audio, code, software applications, documents, access to cloud applications, and the like. In addition, in some cases, as an alternative to conditionally suspending a security requirement that a requestor be authenticated, the security requirement can be temporarily lifted. For example, provision of a particular on-demand product can be initiated according to its standard workflow. According to this example, if the requestor is not authenticated within a certain period of time, or other criteria is met, the provision of the particular on-demand product can be terminated.

Figure 4:
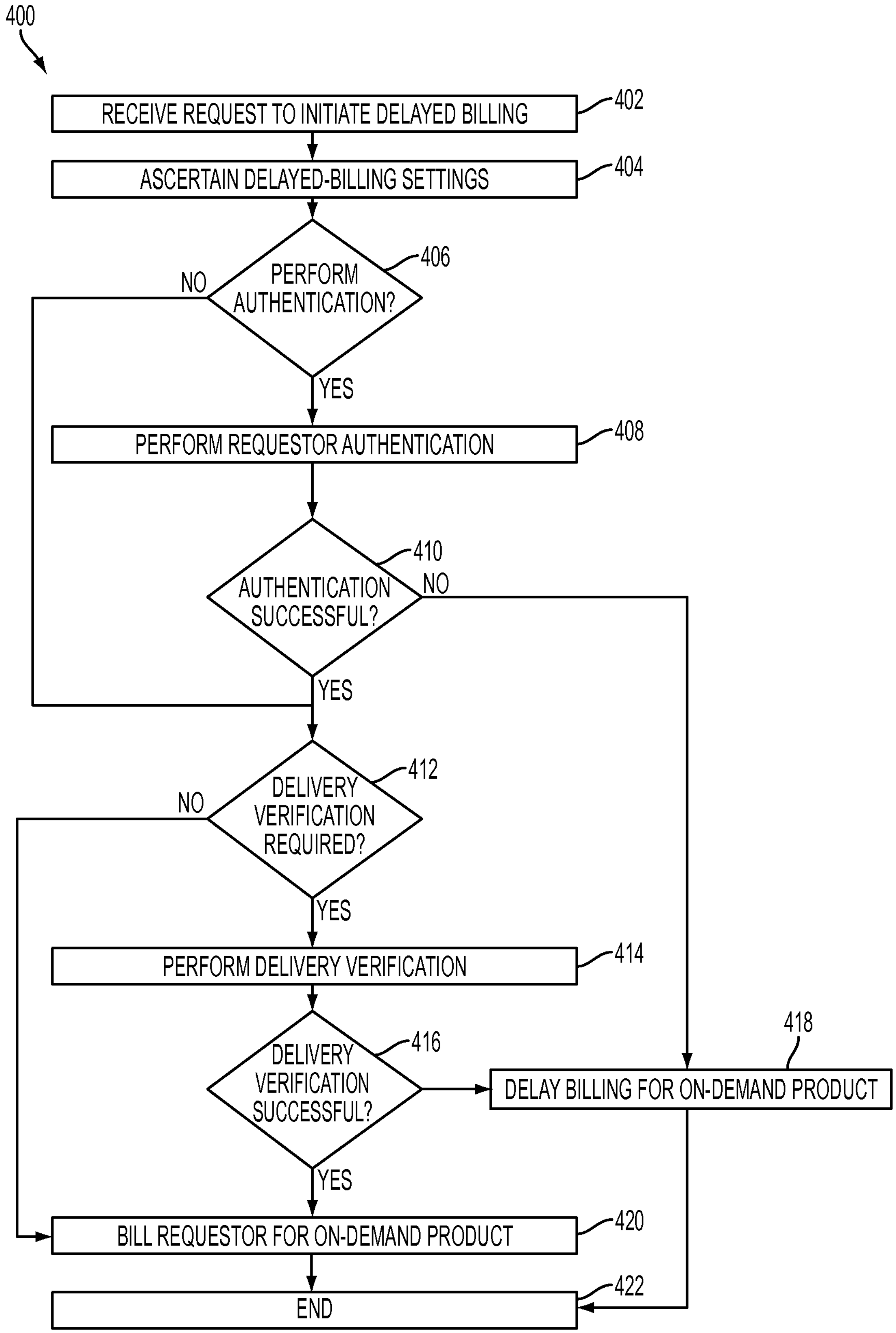
FIG. 4 illustrates an example of a process for delayed billing.

FIG. 4 illustrates an example of a process 400 for delayed billing. The process 400 may be performed by a delayed-billing module such as, for example, the delayed billing module 114(2) of FIG. 1 or the delayed-billing module 214(2) of FIG. 2. The delayed billing module is typically resident and executing on a computer system such as, for example, the product-provision system 110 of FIG. 1 or the identity-product provision system 210 of FIG. 2.

At block 402, the delayed-billing module receives a request to initiate delayed billing. In various cases, the request to initiate delayed billing can be received from a fulfillment module (e.g., the fulfillment module 114(1) or 214(1) of FIGS. 1 and 2, respectively), from a product-provision system generally (e.g., the product-provision system 110 of FIG. 1 or the identity-product provision system 210 of FIG. 2), responsive to a command from an administrator or a component in communication with the delayed-billing module, and/or the like. In general, the request to initiate delayed billing is received in connection with a binding request for an on-demand product from a requestor. The binding request typically identifies a consumer to whom the request relates. For example, the binding request may identify the consumer via PII. At block 404, the delayed-billing module ascertains delayed-billing settings that are applicable to the requested on-demand product. The delayed-billing settings may be acquired from the delayed billing settings 112 of FIG. 1 or the delayed billing settings 212 of FIG. 2.

At decision block 406, the delayed-billing module determines whether requestor authentication needs to be performed. In various embodiments, requestor authentication is a prerequisite to billing for certain types of on-demand products and is specified as such in the delayed-billing settings. Even if the delayed-billing settings specify requestor authentication, requestor authentication may not need to be performed because, for example, requestor authentication has already been performed as part of requesting the requested on-demand product. If it is determined at decision block 406 that requestor authentication does not need to be performed, either because it is not required or because it has already been performed, the process 400 proceeds to block 412. If it is determined at decision block 406 that requestor authentication is required, the process 400 proceeds to block 408.

At block 408, the delayed-billing module performs requestor authentication. Examples of authentication that may occur at block 408 are described in U.S. Pat. No. 7,340,042 and U.S. patent application Ser. No. 13/093,664 (each of which is incorporated by reference above). At decision block 410, the delayed-billing module determines whether the requestor authentication was successful. If it is determined at decision block 410 that the requestor was not successfully authenticated, the process 400 proceeds to block 422 and ends. If it is determined at decision block 410 that the requestor was successfully authenticated, the process 400 proceeds to block 412.

At decision block 412, the delayed-billing module determines whether the delayed-billing settings require delivery verification. If not, the process 400 proceeds to block 420. If it is determined at decision block 412 that the delayed-billing settings require delivery verification, the process 400 proceeds to block 414. At block 414, the delayed-billing module performs delivery verification. In a typical embodiment, the delivery verification involves evaluating one or more product-delivery factors contained within the delayed-billing settings. The one or more product-delivery factors can include, for example, whether the identified consumer has been successfully added to internal systems that provide, for example, a monitoring service, whether the on-demand product has been transmitted in its entirety to the requestor, whether the on-demand product is accessible to the requestor, and the like.

At decision block 416, the delayed-billing module determines whether the delivery verification was successful. In a typical embodiment, the delivery verification is deemed successful if each of the one or more product-delivery factors evaluate to an expected value of true or false, as applicable. In many cases, initiation of provision of an on-demand identity product as described, for example, with respect to block 310 of FIG. 3, may satisfy the one or more product-delivery factors. If the delivery verification was not successful, the process 400 proceeds to block 418. At block 418, the delayed-billing module delays billing the requestor for the requested on-demand product. In various embodiments, the delayed-billing process 400 is re-run later, for example, as a batch billing process for all unbilled requestors. At block 422, the process 400 ends.

If it is determined at decision block 416 that the delivery verification was successful, the process 400 proceeds to block 420. At block 420, the requestor is billed for the requested on-demand product. At block 422, the process 400 ends.

In some embodiments, the process 300 of FIG. 3 and the process 400 of FIG. 4 can be coordinated processes executing on a computer system such as the product provision system 110 of FIG. 1 or the identity-product provision system 210 of FIG. 2 (e.g., as part of the software application 114 or the software application 214). In these embodiments, in some cases, delayed authentication as described with respect to the process 300 can enable faster billing with respect to the process 400. For example, if initiation of provision of an on-demand identity product as described with respect to block 310 of FIG. 3 is sufficient to satisfy product delivery factors as described with respect to blocks 414-416 of FIG. 4, it may be possible to bill a given requestor at an earlier point than would otherwise be feasible without delayed authentication. Advantageously, in certain embodiments, time elapsed between receipt of requests and billing can be reduced, billing operations can be streamlined, and idle time of computer resources (e.g., the computer resources 128 or 228 of FIGS. 1 and 2, respectively) can be reduced.

In certain embodiments, even apart from delayed billing, delayed authentication as described with respect to the process 300 can substantially increase the probability that delivery of a particular on-demand product occurs. In these cases, a risk of premature electronic billing (e.g., billing that occurs before a product is successfully delivered) can be significantly reduced even in cases in which delayed billing as described above is not utilized.

Any suitable combination of various embodiments, or the features thereof, is contemplated. For example, any of the systems or devices disclosed herein can include features of other embodiments. For example, the product-provision system 110 and its components may have any of the features described herein with respect to the identity-product provision system 210 and its components. As another example, any blocks or steps disclosed in a process described herein may be used in other processes described herein. Thus, a block of one of the processes described with respect to FIGS. 3-4 may be used in any of the processes described herein.

Depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. Although certain computer-implemented tasks are described as being performed by a particular entity, other embodiments are possible in which these tasks are performed by a different entity.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, the processes described herein can be embodied within a form that does not provide all of the features and benefits set forth herein, as some features can be used or practiced separately from others. The scope of protection is defined by the appended claims rather than by the foregoing description. All changes which come within the meaning and range of equivalency of the claims are to be embraced within their scope.

What is claimed is:

1. A method comprising:

based at least in part on receipt of a first request for delivery of a first on-demand product, determining that delivery of the first on-demand product to a first user system is successful based at least in part on a first evaluation of first product-delivery factors that are specifically selected for the first on-demand product, where the first product-delivery factors include one or more determinations indicative of delivery of the first on-demand product;

responsive to a determination that delivery of the first on-demand product to the first user system is successful, automatically generating billing instructions that are configured to bill the first user system; and based at least in part on receipt of a second request for delivery of a second on-demand product, determining that delivery of the second on-demand product to a second user system is successful based at least in part on a second evaluation of second product-delivery factors that are specifically selected for the second on-demand product, wherein the second product-delivery factors are different than the first product-delivery factors.

2. The method of claim 1, wherein the first request comprises personally identifying information of a first user, and the second request comprises personally identifying information of a second user.

3. The method of claim 1, wherein the first request is received from the first user system.

4. The method of claim 1, further comprising:

determining that an option for delayed authentication is enabled for the first on-demand product.

5. The method of claim 1, further comprising:

determining that an option for delayed authentication is disabled for the first on-demand product; and requiring that determination that a first user that is associated with the first user system is authenticated is satisfied prior to delivery of the first on-demand product.

6. The method of claim 1, further comprising:

responsive to a determination that delivery of the first on-demand product to the first user system is not successful, automatically generating delayed billing instructions that are configured not to bill the first user system for the first on-demand product at least until successful delivery of the first on-demand product to the first user system can be determined.

7. The method of claim 1, further comprising:

partially registering the first user system for the first on-demand product based at least in part on the first request; and initiating delivery of the first on-demand product to the first user system such that the first user system is restricted access to determined sensitive data.

8. The method of claim 1, where in the one or more determinations include:

(i) a determination that a user associated with the first user system has been successfully added to one or more internal systems that provide a product;

(ii) a determination that the product has been transmitted in its entirety to the first user system; or (iii) a determination that the product is accessible by the first user system.

9. A system comprising:

at least one computer processor, wherein the at least one computer processor is operable to perform a method comprising:

based at least in part on receipt of a first request for delivery of a first on-demand product, determining that delivery of the first on-demand product to a first user system is successful based at least in part on a first evaluation of first product-delivery factors that are specifically selected for the first on-demand product, wherein the first product-delivery factors include one or more determinations indicative of delivery of the first on-demand product;

responsive to a determination that delivery of the first on-demand product to the first user system is successful, automatically generating billing instructions that are configured to bill the first user system; and based at least in part on receipt of a second request for delivery of a second on-demand product, determining that delivery of the second on-demand product to a second user system is successful based at least in part on a second evaluation of second product-delivery factors that are specifically selected for the second on-demand product, wherein the second product-delivery factors are different than the first product-delivery factors.

10. The system of claim 9, wherein the first request comprises personally identifying information of a first user, and the second request comprises personally identifying information of a second user.

11. The system of claim 9, wherein the first request is received from the first user system.

12. The system of claim 9, wherein the at least one computer processor is programmed to:

determining that an option for delayed authentication is enabled for the first on-demand product.

13. The system of claim 9, wherein the at least one computer processor is programmed to:

determining that an option for delayed authentication is disabled for the first on-demand product; and requiring that determination that a first user that is associated with the first user system is authenticated is satisfied prior to delivery of the first on-demand product.

14. The system of claim 9, wherein the at least one computer processor is programmed to:

responsive to a determination that delivery of the first on-demand product to the first user system is not successful, automatically generating delayed billing instructions that are configured not to bill the first user system for the first on-demand product at least until successful delivery of the first on-demand product to the first user system can be determined.

15. The system of claim 9, wherein the at least one computer processor is programmed to:

partially registering the first user system for the first on-demand product based at least in part on the first request; and initiating delivery of the first on-demand product to the first user system such that the first user system is restricted access to determined sensitive data.

16. The system of claim 9, where in the one or more determinations include:

(i) a determination that a user associated with the first user system has been successfully added to one or more internal systems that provide a product;

(ii) a determination that the product has been transmitted in its entirety to the first user system; or (iii) a determination that the product is accessible by the first user system.

17. Non-transitory computer readable medium storing computer executable instructions thereon, the computer executable instructions when executed cause a system to:

based at least in part on receipt of a first request for delivery of a first on-demand product, determine that delivery of the first on-demand product to a first user system is successful based at least in part on a first evaluation of first product-delivery factors that are specifically selected for the first on-demand product, wherein the first product-delivery factors include one or more determinations indicative of delivery of the first on-demand product;

responsive to a determination that delivery of the first on-demand product to the first user system is successful, automatically generate billing instructions that are configured to bill the first user system; and based at least in part on receipt of a second request for delivery of a second on-demand product, determine that delivery of the second on-demand product to a second user system is successful based at least in part on a second evaluation of second product-delivery factors that are specifically selected for the second on-demand product, wherein the second product-delivery factors are different than the first product-delivery factors.

18. The non-transitory computer readable medium of claim 17, wherein the computer executable instructions, when executed, further cause the system to:

determine that an option for delayed authentication is enabled for the first on-demand product.

19. The non-transitory computer readable medium of claim 17, wherein the computer executable instructions, when executed, further cause the system to:

determine that an option for delayed authentication is disabled for the first on-demand product; and require that a determination that a first user that is associated with the first user system is authenticated is satisfied prior to delivery of the first on-demand product.

20. The non-transitory computer readable medium of claim 17, wherein the computer executable instructions, when executed, further cause the system to:

partially register the first user system for the first on-demand product based at least in part on the first request; and initiate delivery of the first on-demand product to the first user system such that the first user system is restricted access to determined sensitive data.

* * * * *